(12) United States Patent
Montanyà Silvestre

(10) Patent No.: US 7,782,026 B2
(45) Date of Patent: Aug. 24, 2010

(54) REGULATOR CIRCUIT AND CORRESPONDING USES

(75) Inventor: Josep Montanyà Silvestre, Rubi (ES)

(73) Assignee: Baolab Microsystems S.L., Barcelona (ES)

( * ) Notice: Subject to any disclaimer, the term of this patent is extended or adjusted under 35 U.S.C. 154(b) by 575 days.

(21) Appl. No.: 11/587,814

(22) PCT Filed: May 9, 2005

(86) PCT No.: PCT/EP2005/005123

§ 371 (c)(1),
(2), (4) Date: Oct. 27, 2006

(87) PCT Pub. No.: WO2005/111759

PCT Pub. Date: Nov. 24, 2005

(65) Prior Publication Data

US 2007/0252562 A1    Nov. 1, 2007

(30) Foreign Application Priority Data

May 19, 2004    (ES)    ................ 200401274

(51) Int. Cl.
G05F 3/00    (2006.01)
(52) U.S. Cl. .................................... 323/233
(58) Field of Classification Search ........... 323/233;
341/126, 155; 363/59, 60; 307/109, 110
See application file for complete search history.

(56) References Cited

U.S. PATENT DOCUMENTS

| 2,218,502 | A |   | 10/1940 | Breitenstien |         |
|-----------|---|---|---------|--------------|---------|
| 4,199,801 | A | * | 4/1980  | Wolf ........................... | 361/272 |
| 4,994,801 | A | * | 2/1991  | Asghar et al. ............... | 341/110 |
| 5,386,438 | A | * | 1/1995  | England ...................... | 375/377 |

| 6,143,997 | A  |   | 11/2000 | Feng et al. |         |
|-----------|----|---|---------|-------------|---------|
| 6,166,671 | A  | * | 12/2000 | Kitagawa et al. ............ | 341/139 |
| 6,307,452 | B1 |   | 10/2001 | Sun         |         |

(Continued)

FOREIGN PATENT DOCUMENTS

EP    1093142    4/2001

(Continued)

OTHER PUBLICATIONS

International Search Report mailed Dec. 22, 2005 in corresponding International Application No. PCT/EP2005/005123.

(Continued)

*Primary Examiner*—Adolf Berhane
*Assistant Examiner*—Yemane Mehari
(74) *Attorney, Agent, or Firm*—Staas & Halsey LLP

(57) ABSTRACT

Regulator circuit and corresponding uses. The regulator circuit includes at least two input terminals, at least two reactances, at least two output terminals, a plurality of interconnections for connecting said reactances with respect to one another and for connecting at least one of the reactances with the input and output terminals. The interconnections include miniaturized relays that allow exchanging a series connection of the reactances for a parallel connection and vice versa. The circuit can include a voltage monitor, power supply modules, input and output protectors, reference signal modules, and control modules. The regulator circuit has multiple applications including charge pump, power supply, DC/DC converter, DC/AC converter, AC/DC converter, D/A converter, A/D converter, and power amplifier.

56 Claims, 23 Drawing Sheets

U.S. PATENT DOCUMENTS

| | | | |
|---|---|---|---|
| 6,621,135 | B1 | 9/2003 | Sridhar et al. |
| 6,717,389 | B1* | 4/2004 | Johnson ..................... 323/282 |
| 6,882,256 | B1 | 4/2005 | Yip |
| 6,882,292 | B1* | 4/2005 | Bardsley et al. ............. 341/121 |
| 6,917,268 | B2 | 7/2005 | Deligianni et al. |
| 7,126,447 | B2 | 10/2006 | Kawai |
| 7,141,989 | B1 | 11/2006 | Liu |
| 7,224,247 | B2 | 5/2007 | Dean |
| 7,280,059 | B1* | 10/2007 | Tsividis ..................... 341/126 |
| 7,368,202 | B2* | 5/2008 | Kurihara et al. ............. 429/209 |
| 7,382,634 | B2* | 6/2008 | Buchmann .................. 363/59 |
| 7,446,300 | B2 | 11/2008 | Silvestre |
| 2001/0004548 | A1 | 6/2001 | French |
| 2002/0140533 | A1 | 10/2002 | Miyazaki et al. |
| 2003/0122640 | A1 | 7/2003 | Deligianni et al. |
| 2004/0080964 | A1 | 4/2004 | Buchmann |
| 2006/0152739 | A1 | 7/2006 | Silvestre |
| 2007/0236307 | A1 | 10/2007 | Liu |
| 2007/0252562 | A1* | 11/2007 | Montanya Silvestre ..... 323/233 |
| 2007/0272529 | A1 | 11/2007 | Silvestre |
| 2008/0093995 | A1* | 4/2008 | Song ..................... 315/209 M |

FOREIGN PATENT DOCUMENTS

| | | |
|---|---|---|
| EP | 1093143 | 4/2001 |
| EP | 1 489 639 | 12/2004 |
| EP | 1564584 | 8/2005 |
| WO | WO 01/06543 | 1/2001 |
| WO | 2004/046019 | 6/2004 |
| WO | 2005/101442 | 10/2005 |

OTHER PUBLICATIONS

International Preliminary Report on Patentability mailed Aug. 31, 2006 in corresponding International Application No. PCT/EP2005/005123.

International Preliminary Report on Patentability dated Jul. 12, 2006 in PCT Application No. PCT/EP2005/004147.

Patent Abstracts of Japan, Publication No. 06209045, Published Jul. 26, 1994.

International Search Report for PCT/ES2003/000583 mailed Feb. 6, 2004.

International Search Report for PCT/EP2006/011234 dated Feb. 15, 2007.

Notice of Allowance mailed Oct. 6, 2009 in co-pending U.S. Appl. No. 11/579,038.

Office Action mailed Dec. 31, 2008, in co-pending U.S. Appl. No. 11/579,038.

Office Action mailed Jul. 7, 2009, in co-pending U.S. Appl. No. 10/534,736.

Office Action mailed Oct. 16, 2008 in co-pending U.S. Appl. No. 10/534,736.

Office Action mailed Dec. 13, 2007 in co-pending U.S. Appl. No. 10/534,736.

Notice of Allowance mailed Jul. 24, 2008 in co-pending U.S. Appl. No. 10/534,745.

U.S. Appl. No. 10/534,736, filed May 12, 2005, Joseph Silvestre, Baolab Microsystems S.L.

U.S. Appl. No. 11/578,722, filed Oct. 18, 2006, Joseph Silvestre, Baolab Microsystems S.L.

U.S. Appl. No. 11/579,038, filed May 12, 2005, Joseph Silvestre, Baolab Microsystems S.L.

U.S. Appl. No. 12/085,441, filed May 23, 2008, Joseph Silvestre, Baolab Microsystems S.L.

* cited by examiner

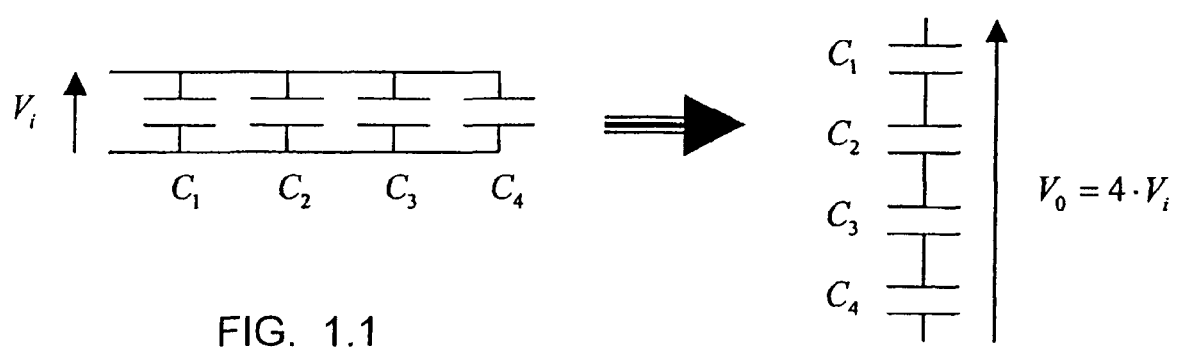
FIG. 1.1
FIG. 1.2
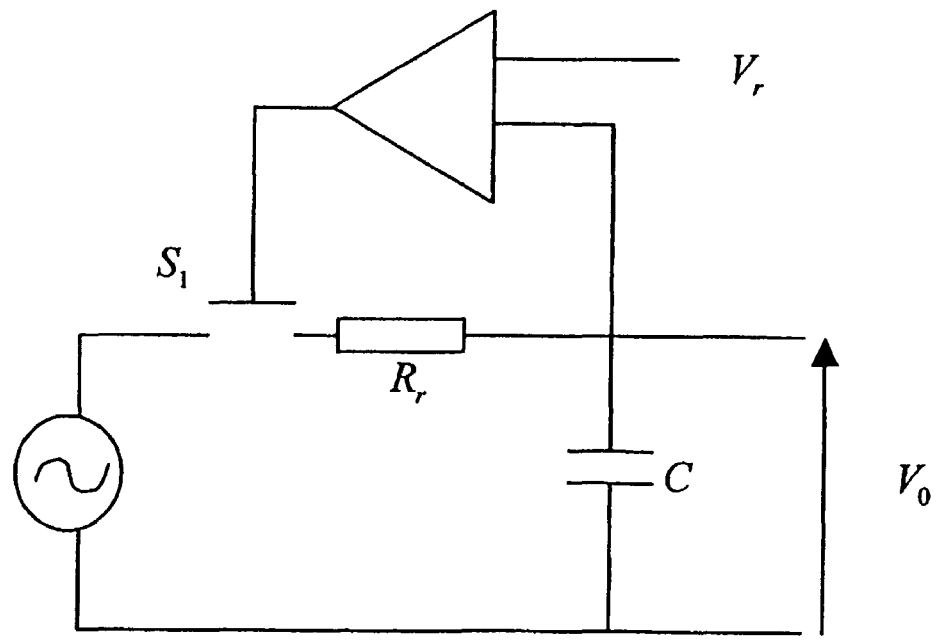
FIG. 2.1

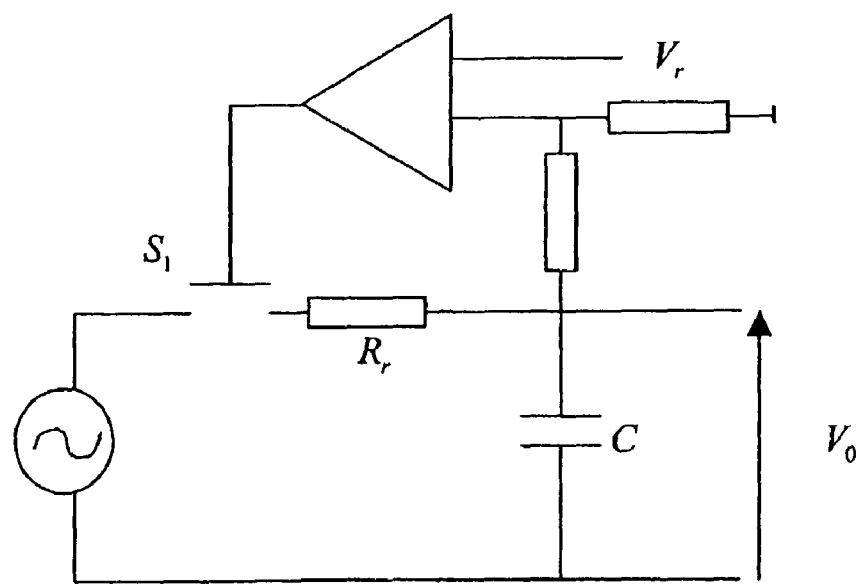
FIG. 2.2
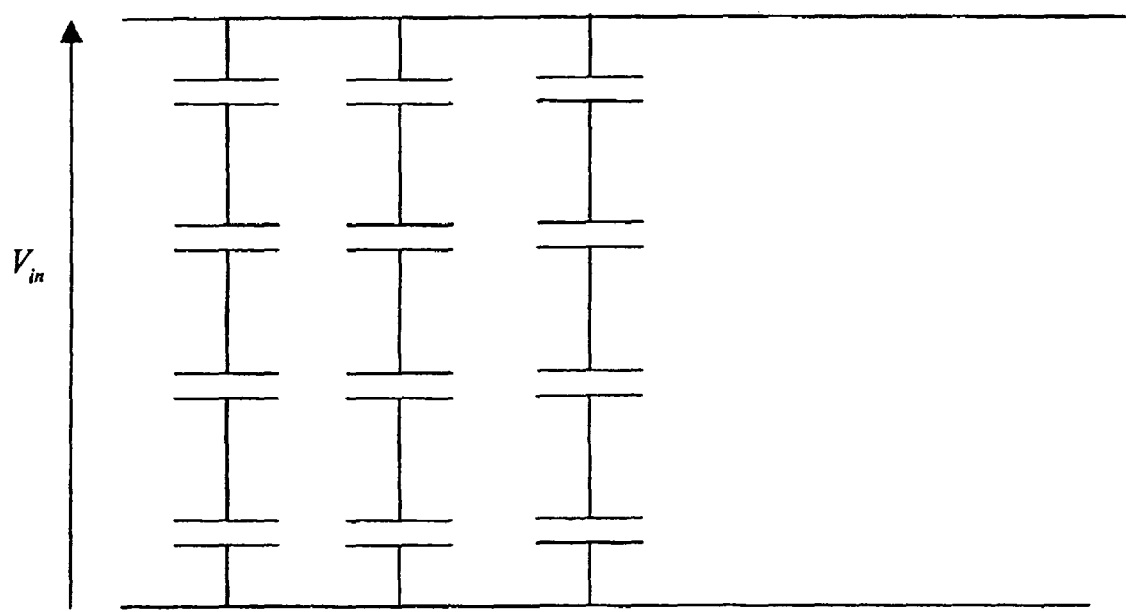
FIG. 3

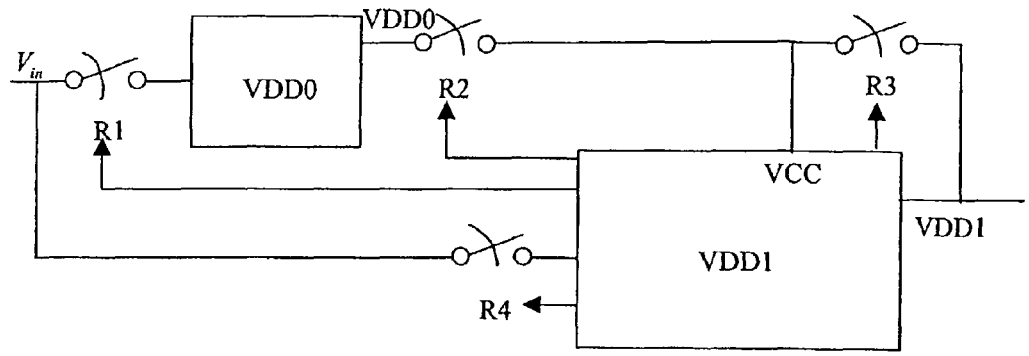
FIG. 4.1
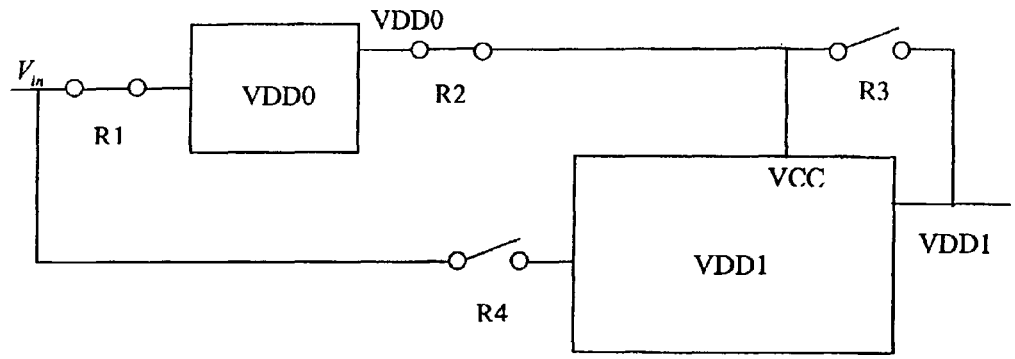
FIG. 4.2
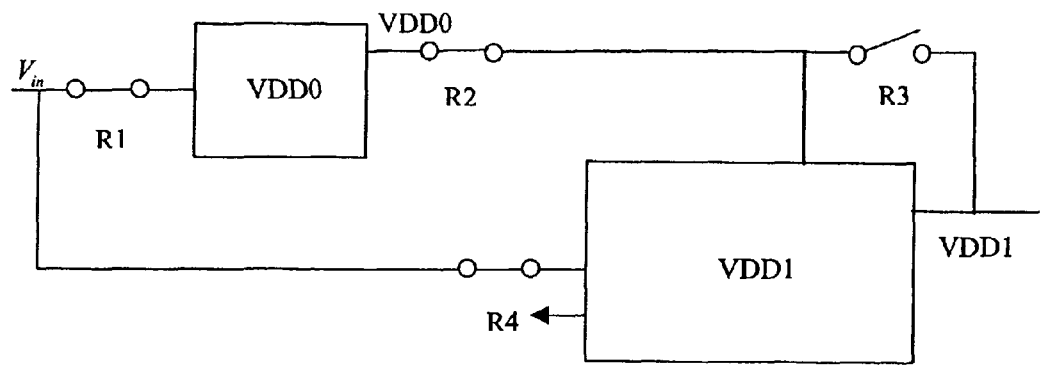
FIG. 4.3

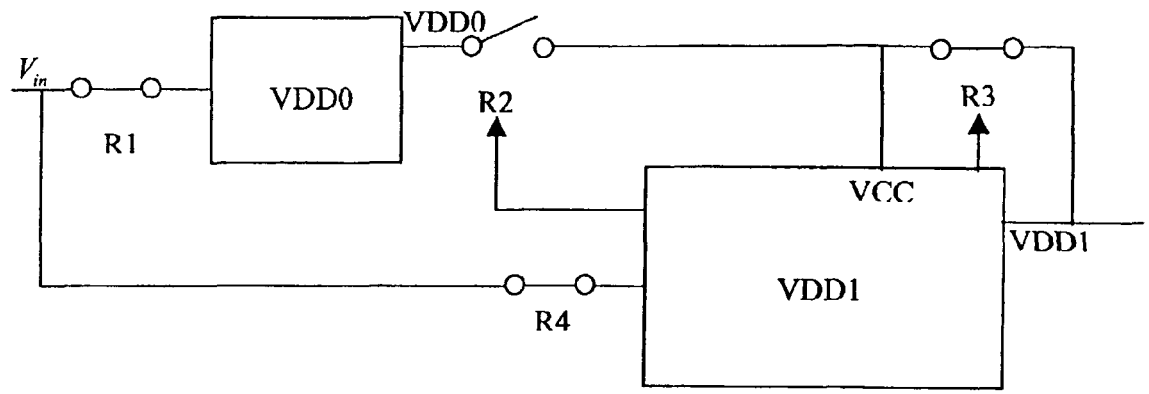
FIG. 4.4
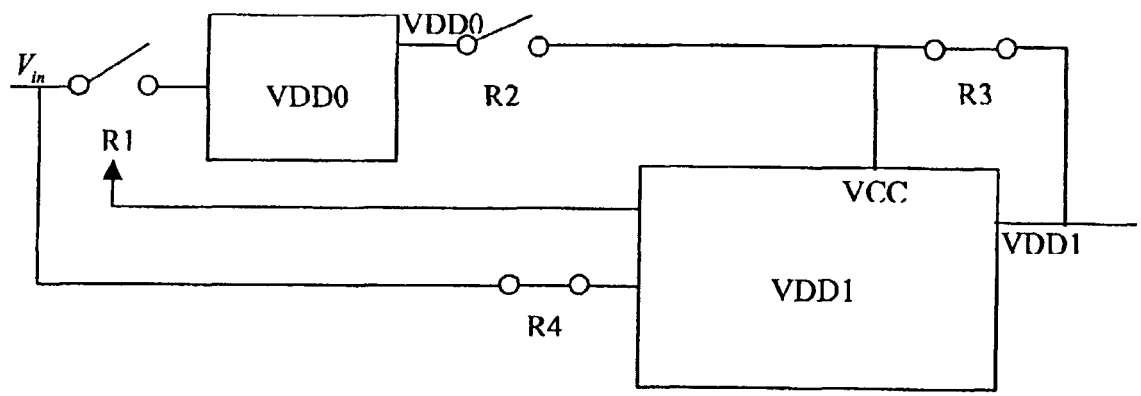
FIG. 4.5

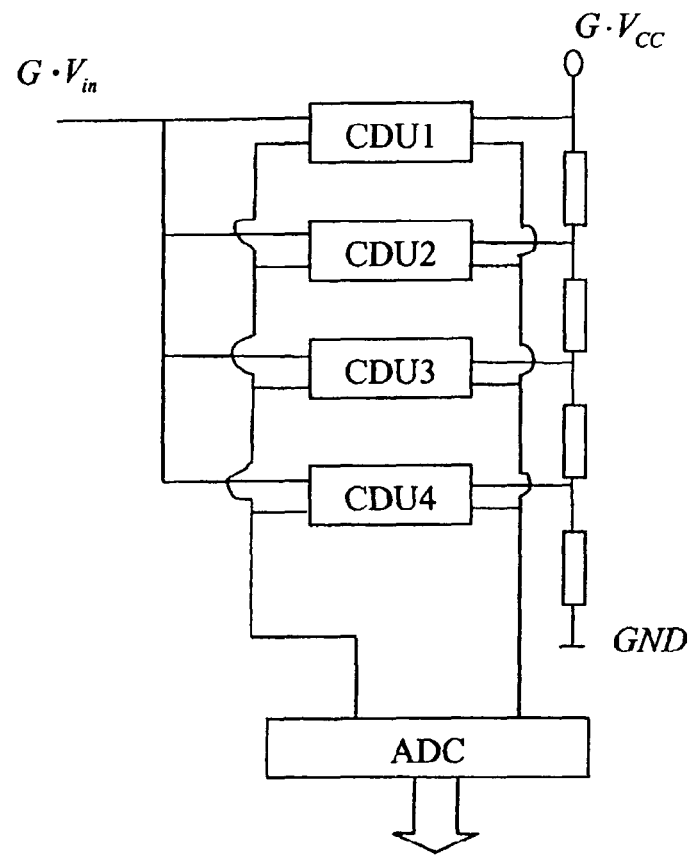
FIG. 5
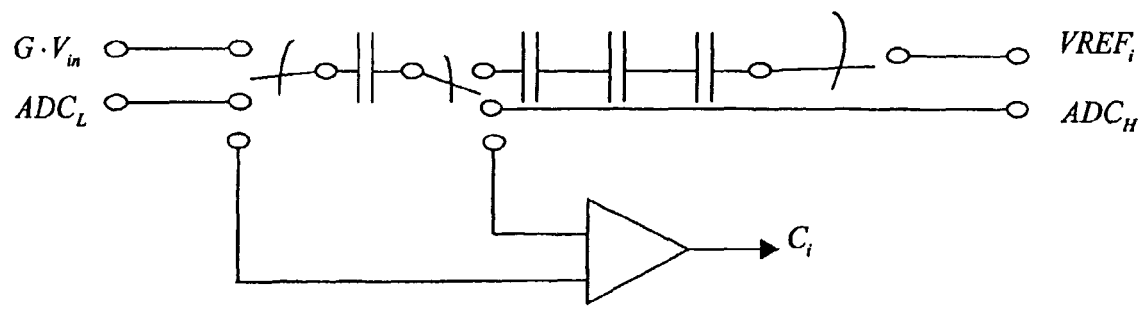
FIG. 6.1

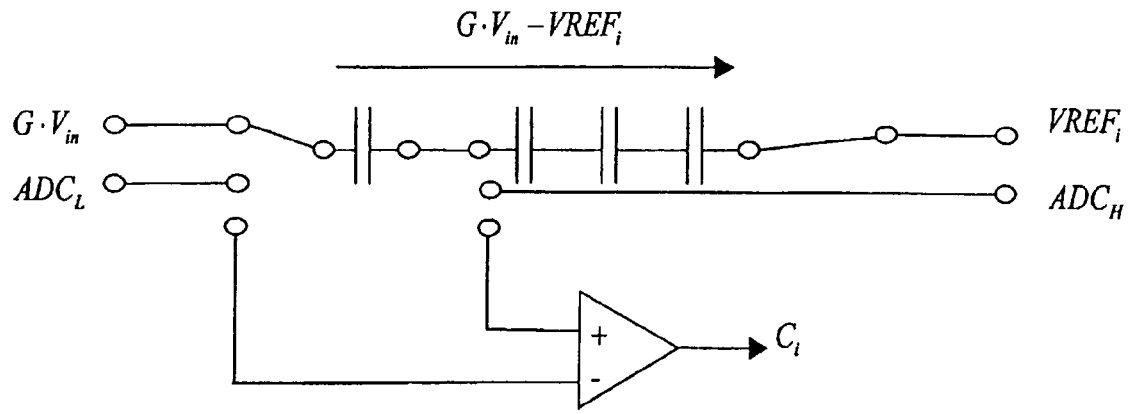
FIG. 6.2
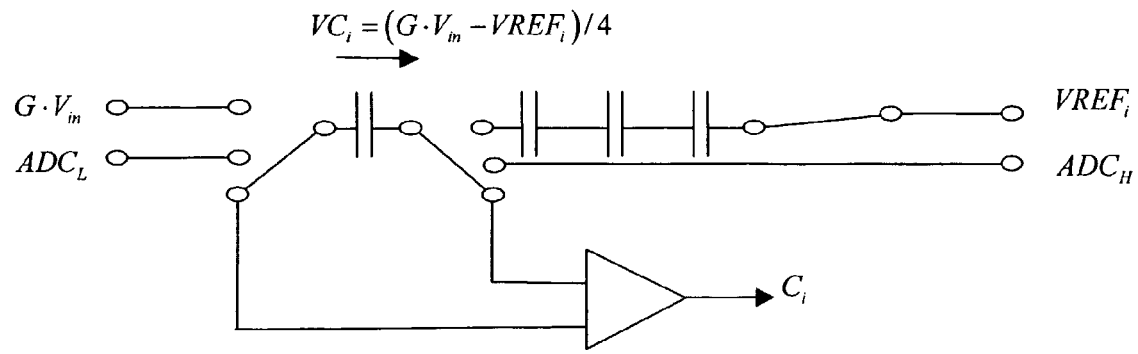
FIG. 6.3

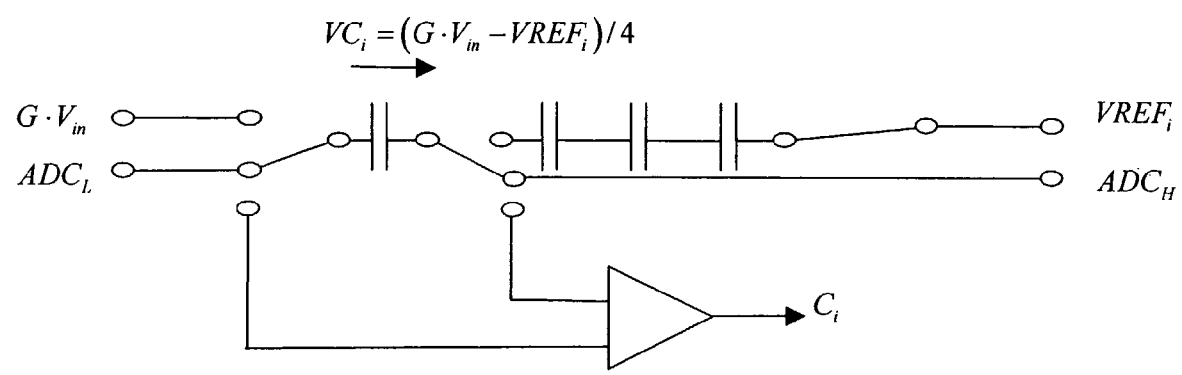
FIG. 6.4
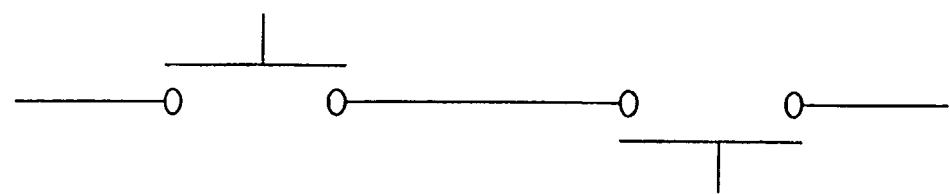
FIG. 25

REGULATOR CIRCUIT AND CORRESPONDING USES

FIELD OF THE INVENTION

The invention relates to a voltage or current regulator circuit, comprising at least two input terminals, at least a first group of reactances with at least two reactances, at least two output terminals, a plurality of interconnections suitable for connecting said reactances with respect to one another and suitable for connecting at least one of said reactances with said input and output terminals. The invention also refers to preferred uses of a regulator circuit according to the invention.

STATE OF THE ART

Circuits, usually called charge pumps or voltage pumps, wherein there are provided several condensers that can be charged at a certain voltage by an external source and that, once charged, they are connected to a certain charge that must be supplied are known. Suitable interconnections allow supplying to the charge a voltage different from the voltage of the external source. Indeed: if the condensers are parallel connected and are connected to the external source, all of them will have the voltage of the external source, and if subsequently they are disconnected from the external source, they are connected again with respect to one another so that they are connected in series and are subsequently connected to the charge, then the charge is supplied with a voltage equivalent to the voltage of the external source multiplied by the number of condensers that have been connected in series. Alternatively, if the condensers are connected in series with respect to one another when they are connected to the external source, and they are connected again in parallel for supplying the charge, then the charge will be supplied with a voltage that will be equal to the voltage of the external source divided by the number of parallel connected condensers.

However, the known circuits in the state of the art have several drawbacks that limit their possible applications:
  they have reduced efficiencies
  they have a reduced amplification capacity
  they have a very reduced power,
  they are very big
  they are noisy Although not all the circuits have all the cited drawbacks, they always have some of said drawbacks.

SUMMARY OF THE INVENTION

The objective of the present invention is to overcome the above mentioned drawbacks. This is achieved by a regulator circuit of the type above indicated wherein the interconnections include miniaturized relays and that the miniaturized relays allow exchange of a series connection of the reactances for a parallel connection and vice versa.

In the present description and claims the word relay refers to a commutator or switch wherein the electric contact is established by means of a conductive element that physically contacts the two circuit ends that are wished to connect and wherein the electric contact is cut off when the conductive element is physically no more in contact with at least one of the circuit ends that is wished to cut off. I.e., the conductive element performs a physical movement (between a first position and a second position) and establishes the electric connections by physically contacting with the corresponding circuit end. Furthermore, the relay must be suitable for opening and closing at least one external electric circuit, wherein at least one of the opening or closing actions of the external electric circuit is carried out by an electromagnetic signal.

Indeed, the use of miniaturized relays allows the following improvements:
  they have a very low strength when they are closed and a very high strength when they are opened. That allows to highly improve the efficacy of the circuit as they minimize the losses due to the Joule effect both in the case of closed circuit and in the case of opened circuit.
  they can work with voltages much higher than the voltages necessary for their activation. This allows generating voltages much higher than the circuit control voltages. Moreover, it is possible to connect a high amount of condensers in parallel (three or more condensers) and then to connect them simultaneously in series, whereby with only two switching steps one can obtain voltage increases as high as wished.
  they allow a very high switching speed. Likewise that is a very important advantage, because the capacity of "pumping" more or less power (i.e., the intensity in case that the voltage is imposed) basically depends on two parameters: the condensers capacity and the "pumping" speed (of switching). The miniaturized relays have a very high switching speed, and that allows reducing the size of the condensers for a certain output power. Thus, the use of miniaturized relays allows a double size reduction: due to the miniaturized relays by themselves, and due to the use of smaller condensers.
  in most cases, it will be possible to have all the circuit miniaturized, including the condensers. That will allow that all the assembly of the regulator circuit, including the assembly of the device comprising the regulator circuit (on which it will be commented later), would be miniaturized, although it would require a plurality of reactance groups with its corresponding interconnections, and even although it would require a plurality of complete regulator circuits.
  the use of miniaturized relays requiring very little energy in order to be activated, such as for example those that will be described below, also allows to improve in an important extent the efficacy of the assembly, as in the praxis a regulator circuit will have a high amount of miniaturized relays that will be connecting and disconnecting at a high speed, whereby their electric consumption is a factor that can be significant if the selected relay is not of low consumption.
  the use of miniaturized relays allows to clearly reduce the acoustic problem, and thus it is not necessary, in general, to include acoustic protections of shield type or the like in spite of having a high amount of relays connecting and disconnecting at a high speed.
  there is a high insulation between the external force and the charge, without an electric path between both of them
  sudden voltage changes at the input of the regulating circuit are softened
  a good performance according to EMC (Electromagnetic Compatibility) requirements is obtained due to the fact that no high frequency signals are generated and, thus, a very small amount of power is irradiated. In this sense it must be taken into account that, although the miniaturized relays will be indeed switching at high frequencies, the power signal has a steady value. Additionally, the possible input interferences do not have an important influence on the output, modifying at maximum the switching time, in case that it would be controlled.

Although in general reference has been made to the specific use of condensers, it must be taken into account that the use of condensers is only a preferred solution. In general, the circuit can have any type of reactances: condensers, coils or even combinations of both. In case of using coils, these can be connected in series and can be charged with current in order to be subsequently connected in parallel and to obtain a final current that would be the initial current (that passes through the series coils) multiplied by the number of coils connected in parallel. That would allow obtaining a current source, that could be of interest as such, or it could be subsequently adapted in order to be able to operate as voltage source. Preferably coils made with superconductive material would be used, and that would allow to reduce the amount of necessary coils, to reduce the switching time requirements of the miniaturised relays, to increase the efficacy as there are not any energetic losses in the coils, and to make possible that all the regulator circuit would be integrated.

Preferably the regulator circuit comprises at least a second group of reactances with at least two reactances, a plurality of interconnections suitable for connecting the reactances of the second group with respect to one another and suitable for connecting at least one of the reactances of the second group with the input and output terminal, wherein the interconnections comprise miniaturized relays, and wherein the miniaturized relays allow to exchange a series connection of the reactances for a parallel connection and vice versa. Basically the idea is the following: given that the first group of reactances discontinuously operates, as while it is charging it is not supplying power to the charge, it is advisable to include an element that allows to keep on supplying the charge during the period of time in which the first group of reactances is charging. This element can be a condenser that performs the function of output filter, or it can be a second group of reactances that is staggered along time with respect to the first group, so that when a group of reactances is charging the other is supplying the charge. Logically, it is possible to have more than two groups operating like this, and even several groups operating like this can be provided and, simultaneously, an output filter.

Advantageously the regulator circuit is integrated in an integrated circuit. In general it is interesting to have all the regulator circuit grouped in the least space possible. Although it is difficult to integrate all the circuit in a SoC (System on Chip) type monolithic integrated circuit as the capacitance values required cannot be included in an monolithic integrated circuit (because very high switching speeds would be required), it is possible to include all the elements in a SIP (System in a Package) type integrated circuit including an MCM (Multi-chip Module) with the corresponding condensers. For the user of it, the assembly is an integrated circuit.

In general the regulator circuit can transform (increase or reduce) any input voltage: either continuous, alternating or variable along time in general, turning it into an output voltage of the same form, but increased or reduced. Likewise it is capable of generating any output voltage:

- it can obtain an output voltage that is always the same (for example 25 V) and always steady.
- it can obtain an output voltage that is always steady but different depending on the charge requirements (by simply programming a different amount of condensers that must be series/parallel switched), so that the user can choose the desired output voltage (for example 15, 20, or 25 V).
- it can obtain an alternating or variable output voltage along time, although the input voltage would be continuous, programming that the amount of condensers that must be series/parallel switched follows a specific sequence along time, or, in general, a module controlling the voltage that must be generated.

Therefore, a preferable use of the regulator circuit according to the invention aims to manufacture a converter of the group formed by DC/DC (continuous current/ continuous current), AC/DC (alternating current/continuous current) and DC/AC (continuous current/alternating current) converters. Or, in other words, the subject of the invention is also a DC/DC, AC/DC and/or DC/AC converter comprising a regulator circuit according to the invention.

BRIEF DESCRIPTION OF THE DRAWINGS

Other advantages and characteristics of the invention will become evident from the following description in which, entirely non-limitatively, are described some preferential embodiments of the invention, with reference to the appended drawings. The figures show:

FIGS. 1.1 and 1.2, a battery of series and parallel connected condensers.

FIGS. 2.1 and 2.2, monitoring and control circuits of the charge of a condenser.

FIG. 3, a battery of series and parallel connected condensers.

FIGS. 4.1 to 4.5, a digital power supplying module and its activation sequence.

FIG. 5, an A/D segmented converter.

FIGS. 6.1 to 6.4, a comparator device and its comparation sequence.

FIG. 25, a normally-off relay.

DETAILED DESCRIPTION

Figure 7:
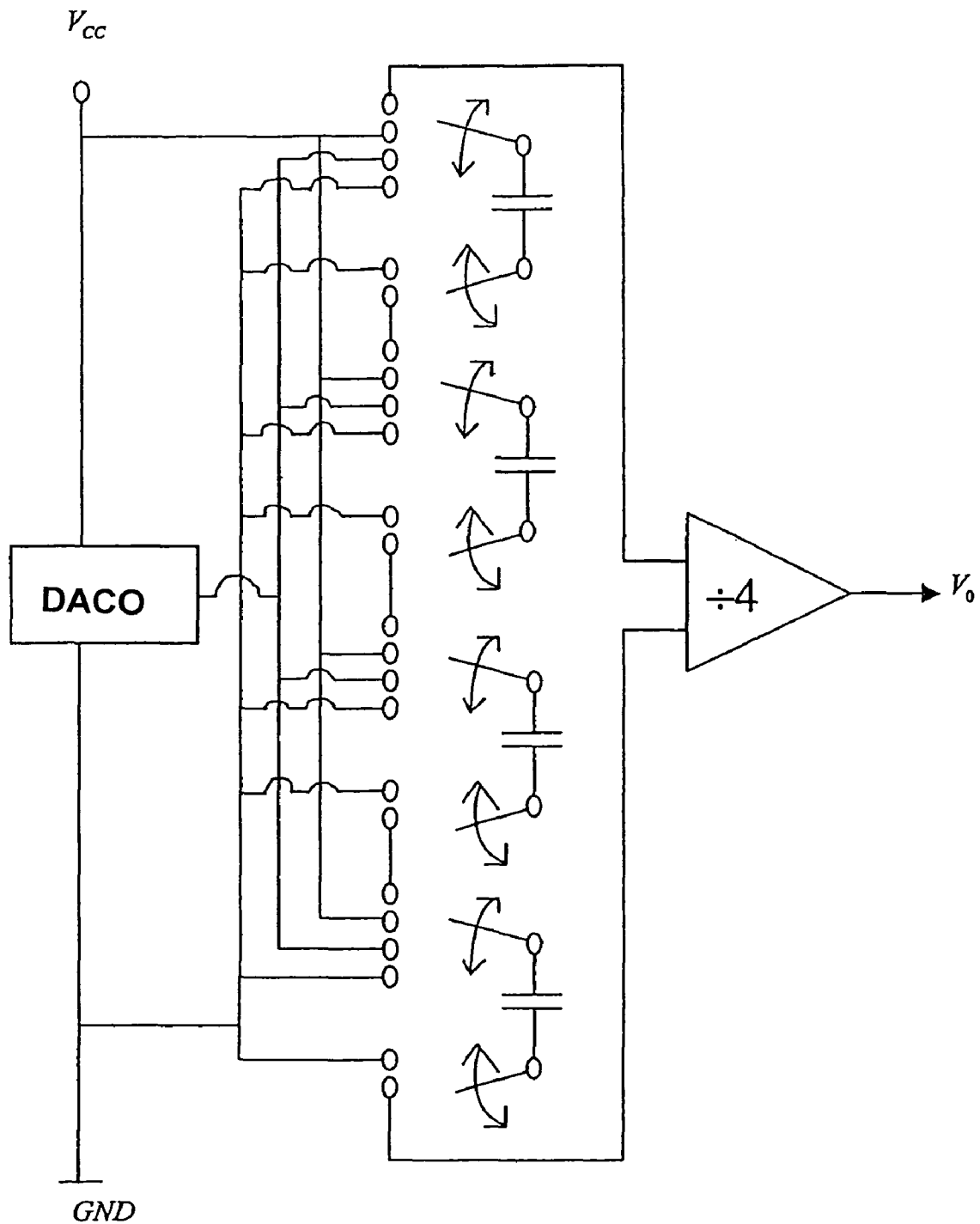
FIG. 7, a D/A converter.

FIGS. 1.1 and 1.2 show the basic concept of charge pumps: a circuit comprising two input terminals and a plurality of condensers $C_1$, $C_2$, $C_3$, $C_4$ series connected with the input terminals. All the condensers are charged at a voltage $V_i$ and subsequently the circuit is connected again so that the condensers are in parallel. The voltage in output terminals $V_o$ is four times the voltage $V_i$. Furthermore, doing the sequence in a reverse way, it is possible to divide the voltage by four. In these schemes neither all the interconnection or the corresponding relays have been shown because a plurality of them must exist in order to allow all the required connections.

With this type of circuit it is possible to increase or reduce the output voltage in a discrete manner: as multiples of the input voltage or as divisions of the input voltage by an integer. Thus, a preferred solution of a regulator circuit according to the invention comprises voltage monitoring means of at least one of the condensers, wherein these monitoring means are suitable for detecting the voltage variation of the condenser along time, and further comprises control means suitable for disconnecting the condenser from the input terminals when the condenser voltage reaches a predetermined value. In fact, in this manner it can be achieved that the condenser (or condensers) is charged with any voltage ranging from 0 and $V_i$, whereby subsequently any voltage value at the output of the regulator circuit can be achieved. An example of monitoring and control means of this type are shown in FIG. 2.1. The relay $S_1$ has a resistance when it is connected that is represented by $R_r$. The voltage in terminals $V_o$ of the condenser C is compared with a reference voltage $V_r$ and the relay is opened when $V_o = V_r$. If the input voltage has pick values higher than the feeding voltage of the comparator, it will be necessary to reduce the voltage arriving to the comparator, and that can be carried out for example placing a resistive voltage divider before the input negative terminal of the comparator, with high resistance values in order not to have remarkable energetic losses (FIG. 2.2).

FIGS. 1.1. and 1.2 show reactance connection basic schemes. However, in order to obtain a higher accuracy in the output signal (without needing to use monitoring means) different strategies can be used:

having two cascade regulator circuits, carrying out a first signal amplification and subsequently a reduction of it (or vice versa). The order will depend on whether the output voltage must be high (in that case the first step will be of reduction in order to avoid too high voltages) or on whether the output voltage is reduced, (in that case the first step will be of amplification in order to avoid too low voltages and noise problems).

having a plurality of parallel reactance batteries, wherein each battery is formed by a plurality of series reactances. All the reactances are simultaneously charged and subsequently the reactances that must be connected to the output in order to reach the desired signal are chosen. An example is shown in FIG. 3 wherein three batteries with four condensers each are shown. In this case, for example, it is possible to amplify the input voltage $V_{in}$ until a maximum of $3 V_{in}$ times its value and in ranges of $V_{in}/4$.

The subject of the invention is also a power supply comprising a regulator circuit according to the invention, or, in other words, the use of a regulator circuit according to the invention for manufacturing a power supply.

The regulator circuit according to the invention preferably comprises at least one of the following additional elements:

a—a digital power supply module, that generates the necessary voltage in order to supply a digital circuitry comprised in the regulator circuit, and that comprises a first power supply having a first normally-on security relay in its first power input terminals, a second power supply having a second normally-off security relay in its second power input terminals, wherein the second relay is closed by means of the voltage generated by the first power supply. The objective of this module is to supply the continues current VDD necessary for the digital circuitry of the regulator circuit.

FIG. 4.1 shows an example of digital power supply module and FIGS. 4.2 to 4.5 show an activation sequence. In order to simplify the schemes, in most part of the following diagrams neither the terminal or the corresponding connections to 0 V (or earthing or ground) are represented. The relays R1 and R2 are normally-on relays and the relays R3 and R4 are normally-off relays. When all the regulator circuit is turned off, $V_{in}=0$, and the situation shown in FIG. 4.2 occurs. The first power supply is represented by VDD0 and the second power supply is represented by VDD1. When applying a voltage $V_{in}$, then VDD0 rectifies this voltage and generates a voltage VCC through its output that supplies the second power supply VDD1. The first thing that VDD1 does when it is activated, is to connect the relay R4 (FIG. 4.3). In this manner VDD1 receives the voltage $V_{in}$ and can regulate it. Preferably the first power supply VDD0 is a conventional lineal power supply and the second power supply VDD1 comprises a second regulator circuit at least comprising two input terminals, at least a first group of reactances with at least two reactances, at least two output terminals, a plurality of interconnections suitable for connecting the reactances with respect to one another and suitable for connecting at least one of the reactances with the input and output terminals, wherein the interconnections comprise miniaturized relays and wherein the miniaturized relays allow to exchange a series connection of said reactances for a parallel connection and vice versa. I.e., preferably the second power supply VDD1 comprises a regulator circuit equal to the regulator circuit that it must supply. After activating the second power supply VDD1, a voltage VCC through the output VDD1 of VDD1 is obtained. At this moment, the relay R2 is opened and the relay R3 is closed (FIG. 4.4). Finally the relay R1 opens, whereby the first power supply VDD0 is disconnected, and the activation sequence is finished (FIG. 4.5).

In general, in the present description and claims, the expressions "normally-on relay" and "normally-off relay" have been used as if they were a single relay. However, there are different forms of designing these relays and in some of them (as it will be seen below) these relays are formed by a plurality of "elemental relays". Therefore, in the present description and claims it will be understood that the expressions "normally-on relay" and "normally-off relay" refer to mechanisms that can be more or less complex, formed by a single physical relay or by several, wherein these mechanisms are capable of performing the functions of a normally-off relay or a normally-on relay.

b—an input protection module comprising a normally-off relay that avoids that overloads arrive to the reactances when the regulator circuit is turned off.

c—a rectifying module that rectifies an input signal connected to said input terminals. Preferably this rectifying module comprises miniaturized relays suitable for reversing the polarity of the input terminals in a dynamic fashion depending on an alternating signal connected to said input terminals that is the one wished to be rectified. This solution is advantageous with respect to a solution based on a bridge of diodes given that it avoids both the voltage fall of them and the consequent power loss.

d—a reference signal module, that compares the signal in said input terminals with the signal in said output terminals and it sends a control signal to a signal regulation module. As it has been previously commented, in general, the regulator circuit can have coils and/or condensers. Thus the reference signal module can be likewise a module operating with voltages or currents. In general, this module will have two input signals: the reference signal and the actual output signal of the regulator circuit, and an output signal that will be responsible for adjusting the actual value to the reference value. Optionally, this reference signal module can include an oscillator so that the regulator circuit will generate an alternating current signal. That would allow, to obtain alternating current from any continuous current source, such as for example of the battery of a vehicle.

e—an output module comprising an output filter with an output condenser that, as previously commented, allows supplying to the charge a more uniform voltage.

f—an output protection module with a normally-off security relay, so that in the case of an overload at the output said relay opens and disconnects said regulator circuit from said output terminals.

These additional modules are particularly interesting if the regulator circuit is incorporated in a power supply, although several of these modules can be used in the other devices that are the subject of this invention, as would be known in the art.

Another preferred use of a regulator circuit according to the invention is for manufacturing an A/D (analog/digital) converter. Or, in other words, the subject of the invention is also an analog/digital converter comprising a regulator circuit according to the invention. In this sense it is advantageous that the regulator circuit according to the invention comprises an A/D converter connected to the output terminals. In fact the regulator circuit amplifies the signal before being digitized. Only by means of a regulator circuit according to the invention it is possible to amplify the signal highly above the supply voltage, as the conventional active amplifiers are not capable of it. In this manner it is achieved to minimized the effect of the noise introduced during the digitalization, given that a signal of a much higher value and that has been amplified by a device further generating very little noise is being digitized. Therefore, if the resolution that can be obtained by the system is of $\Delta V$, as the signal has been amplified without affecting the $\Delta V$, the final resolution will be higher.

Advantageously the AID converter comprises a segmented converter comprising a first voltage divider with G impedances, G comparator devices connected between said output signal and said voltage divider, comprising each of said comparator devices a second voltage divider with G impedances and a comparator, and a second A/D converter. Indeed, a possible drawback of the above A/D converter is that it must convert a signal that possibly has a much higher voltage than the supply voltage of the circuit, and that can be a problem for conventional A/D converters. A way of solving this drawback is by replacing the conventional A/D converter by a RC circuit and a discharge time meter. However this system is not very accurate. The segmented converter allows, however, to obtain a very high resolution.

An example of this segmented converter can be seen in FIG. 5. The segmented converter has an input voltage G $V_{in}$ (that, in fact, will be the output voltage in the regulator circuit terminals) that is G times the original voltage to be digitized. I.e., the regulator circuit has amplified the original signal by a factor of G. Then the segmented converter divides the reference voltage G-$V_{CC}$ by the first voltage divider (having G impedances), and compares the signal G-$V_{in}$ with the voltage of each of the segments of the first voltage divider in the corresponding comparator device CDU. In the example of FIG. 5 the segmented converter has four comparator devices (G=4) indicated with CDU1, CDU2, CDU3, and CDU4. In this manner it can determine within which voltage segment is G-$V_{in}$. In this manner the more significant bits of the digitilized signal $V_{in}$ are determined. Finally, the signal corresponding to the "border" segment is taken, it is divided by G through a second voltage divider included in each comparator device CDU and it is sent to a second A/D converter ADC, that can be conventional. This second A/D converter ADC will be responsible for the less significant bits of the digitalized signal.

In FIG. 6.1 it is observed that a comparator device CDU and in FIGS. 6.2 to 6.4 its comparation sequence. The comparator device CDU firstly connects its voltage divider (the second voltage divider that each comparator device has, and that is formed in this example by four series condensers) to the voltage corresponding to the first voltage divider VREF$_i$, on the one hand, and to G-$V_{in}$, on the other hand (FIG. 6.2). As it can be seen, the voltage drop in terminals of the second voltage divider will be different for each comparator device CDU as VREF$_i$ is different for each comparator device CDU, so that for some it will be a negative voltage whilst for others it will be a positive voltage. Then it is detected whether said voltage difference is positive or negative by connecting the terminals of one of the condensers (we will have VC$_i$, i.e. the voltage difference divided by 4, so ensuring that we are always within the operating range of the used electronics) to a comparator that will give a C$_i$, signal indicative of the sign of the voltage difference (FIG. 6.3). Knowing in which comparator device the sign change takes place, it is already possible to determine the most important bits of the digital signal. Finally (FIG. 6.4) the voltage is connected in the terminals of one of the condensers (of the same that has served for detecting the change of the voltage sign or of another condenser of the second voltage divider) to the terminals ADC$_L$ and ADC$_H$ of a conventional A/D converter, that will determine the less important bits of the digital signal.

Another preferred use of a regulator circuit according to the invention is for manufacturing a D/A (digital/analog) converter. Or, in other words, the subject of the invention is also a D/A (digital/analog) converter that comprises a regulator circuit according to the invention. In this sense it is advantageous that the regulator circuit according to the invention comprises a D/A converter connected to its input terminals. An example of a D/A converter according to the invention is shown in FIG. 7. In this example the regulator circuit has four condensers that can be independently connected to Vcc, to GND, or to an output of a conventional D/A converter DAC0. Furthermore it is possible to connect the four condensers in series. If one supposes, by way of example, that Vcc is 5V then the maximum value at the output of the four condensers connected in series will be of 20V, that is, the signal has been amplified four times. If the digitalized signal corresponds to 3V (i.e., 3;5 of the reference value), then the output voltage of the condensers connected in series will have to be of 12V. A digital circuitry, properly programmed, carries out these calculations and performs the following actions:

it activates the corresponding relays in order that the lower two relays are connected to Vcc (5V+5V=10V), in parallel with respect to one another, it sends the corresponding digital value in order that the D/A converter DAC0 generates a voltage of 2V, it activates the relay of the third condenser in order to connect it to the D/A converter DAC0 (10V+2V=12V), it activates the relay of the fourth condenser in order to connect it to GND.

Once the condensers are charged, they are connected in series and the voltage of 12V is obtained (corresponding to 3/5 of the reference value that now is of 20V).

In this manner a D/A converter of more accurateness, less cost and faster, in particular in the case of high accuracies is achieved.

Preferably the regulator circuit (that is part of the D/A converter) comprises a second regulator circuit that at least comprises two input terminals, at least a first group of reactances with at least two reactances, at least two output terminals, a plurality of interconnections suitable for connecting the reactances with respect to one another and suitable for connecting at least one of the reactances with the input and output terminals, wherein the interconnections comprise miniaturized relays and wherein the miniaturized relays allow to exchange a series connection of the reactances for a parallel connection and vice versa, wherein this second regulator circuit is connected to the output terminals of the first regulator circuit. Indeed, this second regulator circuit is shown in FIG. 7 as the amplifier ÷4. Its function is to adjust again the signal to the reference value Vcc, so that, following the previous example, the value of Vo would finally be the 3V that were wished to obtain.

Advantageously the regulator circuit (that is part of the D/A converter) comprises an output buffer and/or a track and hold amplifier. That allows to disengage the reactances of the charge applied to the D/A converter and to maintain the signal generated during some time. Alternatively according to the invention several D/A converters connected in parallel could be used so that they are sequentially connected to the charge.

The subject of the invention is also the use of a regulator circuit according to the invention to manufacture a power amplifier, i.e., the invention also relates to power amplifiers comprising a regulator circuit according to the invention.

The invention further relates to a regulator circuit comprising one (or several) miniaturized relay particularly suitable for the above applications.

Currently there are various alternatives for the production of miniaturized relays, in particular, in the context of technologies known as MEMS technology (micro electro-mechanical), Microsystems and/or Micromachines. In principal such may be classified according to the type of force or actuation mechanism they use to move the contact electrode. The classification usually applied is thus between electrostatic, magnetic, thermal and piezoelectric relays. Each one has its advantages and its drawbacks. However miniaturization techniques require the use of activation voltages and surfaces which are as small as possible. Relays known in the state of the art have several problems impeding their advance in this respect.

A manner of reducing the activation voltage is precisely to increase the relay surface areas, which renders miniaturization difficult, apart from being conducive to the appearance of deformations reducing the useful life and reliability of the relay. In electrostatic relays, another solution for decreasing the activation voltage is to greatly reduce the space between the electrodes, or use very thin electrodes or special materials, so that the mechanical recovery force is very low. However this implies problems of sticking, since capillary forces are very high, which thus also reduces the useful working life and reliability of these relays. The use of high activation voltages also has negative effects such as ionization of the components, accelerated wearing due to strong mechanical solicitation and the electric noise which the relay generates.

Electrostatic relays also have a significant problem as to reliability, due to the phenomenon known as "pull-in", and which consists in that, once a given threshold has been passed, the contact electrode moves in increasing acceleration against the other free electrode. This is due to the fact that as the relay closes, the condenser which exerts the electrostatic force for closing, greatly increases its capacity (and would increase to infinity if a stop were not imposed beforehand). Consequently there is a significant wear on the electrodes due to the high electric field which is generated and the impact caused by the acceleration to which the moving electrode has been exposed.

Thermal, magnetic and piezoelectric approaches require special materials and micromachined processes, and thus integration in more complex MEMS devices, or in a same integrated with electronic circuitry is difficult and/or costly. Additionally the thermal approach is very slow (which is to say that the circuit has a long opening or closing time) and uses a great deal of power. The magnetic approach generates electromagnetic noise, which renders having close electronic circuitry much more difficult, and requires high peak currents for switching.

In the present description and claims the expression "contact point" has been used to refer to contact surfaces in which an electric contact is made (or can be made). In this respect, they should not be understood as points in the geometric sense, since they are three-dimensional elements, but rather in the electric sense, as points in an electric circuit.

Thus the invention has another preferred embodiment by which at least one of the miniaturized relays of the regulator circuit comprises:

a first zone facing a second zone, a first condenser plate, a second condenser plate arranged in the second zone, in which the second plate is smaller than or equal to the first plate, an intermediate space arranged between the first zone and the second zone, a conductive element arranged in the intermediate space, the conductive element being mechanically independent of the first zone and the second zone and being suitable for performing a movement across the intermediate space dependant on voltages present in the first and second condenser plates, a first contact point of an electric circuit, a second contact point of the electric circuit, in which the first and second contact point define first stops, in which the conductive element is suitable for entering into contact with the first stops and in which the conductive element closes the electric circuit when in contact with the first stops.

In fact in the relay according to the invention the conductive element, which is to say the element responsible for opening and closing the external electric circuit (across the first contact point and the second contact point), is a detached part capable of moving freely. I.e. the elastic force of the material is not being used to force one of the relay movements. This allows a plurality of different solutions, all benefiting from the advantage of needing very low activation voltages and allowing very small design sizes. The conductive element is housed in the intermediate space. The intermediate space is closed by the first and second zone and by lateral walls which prevent the conductive element from leaving the intermediate space. When voltage is applied to the first and second condenser plate charge distributions are induced in the conductive element which generates electrostatic forces which in turn move the conductive element in a direction along the intermediate space. By means of different designs to be described in detail below this effect can be used in several different ways.

Additionally, a relay according to the invention likewise satisfactorily resolves the previously mentioned problem of "pull-in".

Another additional advantage of the relay according to the invention is the following: in conventional electrostatic relays, if the conductive element sticks in a given position (which depends to a great extent, among other factors, on the humidity) there is no possible manner of unsticking it (except by external means, such as for example drying it) since due to the fact that the recovery force is elastic, is always the same (depending only on the position) and cannot be increased. On the contrary, if the conductive element sticks in a relay according to the invention, it will always be possible to unstick it by increasing the voltage.

The function of the geometry of the intermediate space and the positioning of the condenser plates can furnish several different types of relays, with as many applications and functioning methods.

For example, the movement of the conductive element can be as follows:
- a first possibility is that the conductive element moves along the intermediate space with a movement of translation, i.e., in a substantially rectilinear manner (excluding of course possible impacts or oscillations and/or movements provoked by unplanned and undesired external forces) between the first and second zones.
- a second possibility is that the conductive element have a substantially fixed end, around which can rotate the conductive element. The rotational axis can serve the function of contact point for the external electric circuit and the free end of the conductive element can move between the first and second zones and make, or not make, contact with the other contact point, depending on its position. As will be outlined below, this approach has a range of specific advantages.

Advantageously the first contact point is between the second zone and the conductive element. This allows a range of solutions to be obtained, discussed below.

A preferable embodiment is achieved when the first plate is in the second zone. Alternatively the relay can be designed so that the first plate is in the first zone. In the first case a relay is obtained which has a greater activation voltage and which is faster. On the other hand, in the second case the relay is slower, which means that the shocks experienced by the conductive element and the stops are smoother, and energy consumption is lower. One can obviously choose between one or the other alternatives depending on the specific requirements in each case.

A preferable embodiment of the invention is obtained when the second contact point is likewise in the second zone. In this case one will have a relay in which the conductive element performs the substantially rectilinear translation movement. When the conductive element is in contact with the first stops, which is to say with the first and second contact point of the electric circuit, the electric circuit is closed, and it is possible to open the electric circuit by means of different types of forces, detailed below. To again close the electric circuit, it is enough to apply voltage between the first and second condenser plates. This causes the conductive element to be attracted toward the second zone, again contacting the first and second contact point.

Should the first condenser plate be in the first zone and the second condenser plate in the second zone, a manner of achieving the necessary force to open the circuit cited in the above paragraph is by means of the addition of a third condenser plate arranged in the second zone, in which the third condenser plate is smaller than or equal to the first condenser plate, and in which the second and third condenser plates are, together, larger than the first condenser plate. With this arrangement the first condenser plate is to one side of the intermediate space and the second and third condenser plates are to the other side of the intermediate space and close to one another. In this manner one can force the movement of the conductive element in both directions by means of electrostatic forces and, in addition, one can guarantee the closing of the external electric circuit even though the conductor element remains at a voltage in principle unknown, which will be forced by the external circuit that is closed.

Another preferable embodiment of the invention is achieved when the relay additionally comprises a third condenser plate arranged in said second zone and a fourth condenser plate arranged in said first zone, in which said first condenser plate and said second condenser plate are equal to each other, and said third condenser plate and said fourth condenser plate are equal to one another. In fact, in this manner, if one wishes the conductive element to travel towards the second zone, one can apply voltage to the first and fourth condenser plates, on one side, and to the second or to the third condenser plates, on the other side. Given that the conductive element will move toward the place in which is located the smallest condenser plate, it will move toward the second zone. Likewise one can obtain movement of the conductive element toward the first zone by applying a voltage to the second and third condenser plates and to the first or the fourth condenser plates. The advantage of this solution, over the simpler three condenser plate solution, is that it is totally symmetrical, which is to say that it achieves exactly the same relay behavior irrespective of whether the conductive element moves toward the second zone or the first zone. Advantageously the first, second, third and fourth condenser plates are all equal with respect to one another, since generally it is convenient that in its design the relay be symmetrical in several respects. On one hand there is symmetry between the first and second zone, as commented above. On the other hand it is necessary to retain other types of symmetry to avoid other problems, such as for example the problems of rotation or swinging in the conductive element and which will be commented upon below. In this respect it is particularly advantageous that the relay comprise, additionally, a fifth condenser plate arranged in the first zone and a sixth condenser plate arranged in the second zone, in which the fifth condenser plate and the sixth condenser plate are equal to each other. On one hand increasing the number of condenser plates has the advantage of better compensating manufacturing variations. On the other, the several different plates can be activated independently, both from the point of view of voltage applied as of activation time. The six condenser plates can all be equal to each other, or alternatively the three plates of a same side can have different sizes with respect to one another. This allows minimizing activation voltages. A relay which has three or more condenser plates in each zone allows the following objectives to all be achieved:

it can function in both directions symmetrically, it has a design which allows a minimum activation voltage for fixed overall relay dimensions, since by having two plates active in one zone and one plate active in the other zone distinct surface areas can always be provided, it allows minimization of current and power consumption, and also a smoother relay functioning, it can guarantee the opening and closing of the relay, independently of the voltage transmitted by the external electric circuit to the conductive element when they enter in contact, in particular if the relay has six condenser plates in each zone, it can in addition comply with the requirement of central symmetry which, as we shall see below, is another significant advantage. Therefore another preferable embodiment of the invention is obtained when the relay comprises six condenser plates arranged in the first zone and six condenser plates arranged in the second zone. However it is not absolutely necessary to have six condenser plates in each zone to achieve central symmetry: it is possible to achieve it as well, for example, with three condenser plates in each zone, although in this case one must forego minimizing current and power consumption and optimizing the "smooth" functioning of the relay. In general, increasing the number of condenser plates in each zone allows greater flexibility and versatility in the design, whilst it allows a reduction of the variations inherent in manufacture, since the manufacturing variations of each of the plates will tend to be compensated by the variations of the remaining plates.

However it should not be discounted that in certain cases it can be interesting to deliberately provoke the existence of force moments in order to force the conductive element to perform some kind of revolution additional to the translation movement. It could be advantageous, for example, to overcome possible sticking or friction of the conductive element with respect to the fixed walls.

Advantageously the relay comprises a second stop (or as many second stops as there are first stops) between the first zone and the conductive element. In this manner one also achieves a geometric symmetry between the first zone and the second zone. When the conductive element moves toward the second zone, it can do so until entering into contact with the first stops, and will close the external electric circuit. When the conductive element moves toward the first zone it can do so until entering into contact with the second stop(s). In this manner the movement performed by the conductive element is symmetrical.

Another preferable embodiment of the invention is achieved when the relay comprises a third contact point arranged between the first zone and the conductive element, in which the third contact point defines a second stop, such that the conductive element closes a second electric circuit when in contact with the second contact point and third contact point. In this case the relay acts as a commuter, alternately connecting the second contact point with the first contact point and with the third contact point.

A particularly advantageous embodiment of the previous example is achieved when the conductive element comprises a hollow cylindrical part which defines a axis, in the interior of which is housed the second contact point, and a flat part which protrudes from one side of the radially hollow cylindrical part and which extends in the direction of the axis, in which the flat part has a height, measured in the direction of the axis, which is less than the height of the cylindrical part, measured in the direction of the axis. This specific case complies simultaneously with the circumstance that the conductive element perform a rotational movement around one of its ends (cf. the "second possibility" cited above). Additionally, the cylindrical part is that which rests on bearing surfaces (one at each end of the cylinder, and which extends between the first zone and the second zone) whilst the flat part is cantilevered with respect to the cylindrical part, since it has a lesser height. Thus the flat part is not in contact with walls or fixed surfaces (except the first and third contact point) and, in this manner, the sticking and frictional forces are lessened. As to the second point of contact, it is housed in the internal part of the cylindrical part, and serves as rotational axis as well as second contact point. Thus an electric connection is established between the first and second contact points or between the third and second contact points. The hollow cylindrical part defines a cylindrical hollow, which in all cases has a surface curved to the second contact point, thus reducing the risks of sticking and frictional forces.

Another particularly advantageous embodiment of the previous example is obtained when the conductive element comprises a hollow parallelepipedic part which defines a axis, in the interior of which is housed the second contact point, and a flat part which protrudes from one side of the radially hollow paralelepipedic part and which extends in the direction of the axis, in which the flat part has a height, measured in the direction of the axis, which is less than the height of the parallelepipedic part, measured in the direction of the axis. In fact, it is an embodiment similar to that above, in which the parallelepipedic part defines a parallelepipedic hollow. This solution can be particularly advantageous in the case of very small embodiments, since in this case the resolution capacity of the manufacturing process (in particular in the case of the photolithographic procedures) obliges the use of straight lines. In both cases it should be emphasized that the determining geometry is the geometry of the interior hollow and that, in fact, several different combinations are possible:

axis (second contact point) having a rectangular section and hollow with rectangular section, axis having a circular section and hollow having a circular section axis having a circular section and hollow having a rectangular section, and vice versa although the first two combinations are the most advantageous.

Logically, should the sections be rectangular, there should be enough play between the axis and the parallelepipedic part such that the conductive element can rotate around the axis. Likewise in the case of circular sections there can be a significant amount of play between the axis and the cylindrical part, such that the real movement performed by the conductive element is a combination of rotation around the axis and translation between the first and second zone. It should be noted, additionally, that it is also possible that the second stop not be connected electrically to any electric circuit: in this case a relay will be obtained which can open and close only one electric circuit, but in which the conductive element moves by means of a rotation (or by means of a rotation combined with translation).

Another preferable embodiment of the invention is obtained when the relay comprises a third and a fourth contact points arranged between the first zone and the conductive element, in which the third and fourth contact points define second stops, such that the conductive element closes a second electric circuit when in contact with the third and fourth contact points. In fact, in this case the relay can alternatively connect two electric circuits.

Advantageously each of the assemblies of condenser plates arranged in each of the first zone and second zone is centrally symmetrical with respect to a center of symmetry, in which said center of symmetry is superposed to the center of masses of the conductive element. In fact, each assembly of the condenser plates arranged in each of the zones generates a field of forces on the conductive element. If the force resulting from this field of forces has a non nil moment with respect to the center of masses of the conductive element, the conductive element will not only undergo translation but will also undergo rotation around its center of masses. In this respect it is suitable to provide that the assemblies of plates of each zone have central symmetry in the case that this rotation is not advantageous, or on the other hand it could be convenient to provide central asymmetry should it be advantageous to induce rotation in the conductive element with respect to its center of masses, for example to overcome frictional forces and/or sticking.

As already indicated, the conductive element is usually physically enclosed in the intermediate space, between the first zone, the second zone and lateral walls. Advantageously between the lateral walls and the conductive element there is play sufficiently small such as to geometrically prevent the conductive element entering into contact simultaneously with a contact point of the group formed by the first and second contact points and with a contact point of the group formed by the third and fourth contact points. That is to say, the conductive element is prevented from adopting a transversal position in the intermediate space in which it connects the first electric circuit to the second electric circuit.

To avoid sticking and high frictional forces it is advantageous that the conductive element has rounded external surfaces, preferably that it be cylindrical or spherical. The spherical solution minimizes the frictional forces and sticking in all directions, whilst the cylindrical solution, with the bases of the cylinder facing the first and second zone allow reduced frictional forces to be achieved with respect to the lateral walls whilst having large surfaces facing the condenser plates—efficient as concerns generation of electrostatic forces. This second solution also has larger contact surfaces with the contact points, diminishing the electric resistance which is introduced in the commuted electric circuit.

Likewise, should the conductive element have an upper face and a lower face, which are perpendicular to the movement of the conductive element, and at least one lateral face, it is advantageous that the lateral face has slight protuberances. These protuberances will further allow reduction of sticking and frictional forces between the lateral face and the lateral walls of the intermediate space.

Advantageously the conductive element is hollow. This allows reduced mass and thus achieves lower inertia.

Should the relay have two condenser plates (the first plate and the second plate) and both in the second zone, it is advantageous that the first condenser plate and the second condenser plate have the same surface area, since in this manner the minimal activation voltage is obtained for a same total device surface area.

Should the relay have two condenser plates (the first plate and the second plate) and the first plate is in the first zone whilst the second plate is in the second zone, it is advantageous that the first condenser plate has a surface area that is equal to double the surface area of the second condenser plate, since in this manner the minimal activation voltage is obtained for a same total device surface area.

Another preferable embodiment of a relay according to the invention is obtained when one of the condenser plates simultaneously serves as condenser plate and as contact point (and thus of stop). This arrangement will allow connection of the other contact point (that of the external electric circuit) at a fixed voltage (normally VCC or GND) or leaving it at high impedance.

Usually the relay will be opened and closed by voltages applied to the plates of the condensers. However it is possible to make one of the movements by another physical magnitude. In such cases, the physical magnitude exerts a force to open the electric circuit and by means of a given voltage applied to the condenser plates a force is generated which counteracts the former and the external electric circuit is again closed (or vice versa, i.e., it is necessary to apply a voltage to maintain the electric circuit open whilst the physical magnitude which one wishes to study tends to close the circuit). Examples of these physical magnitudes can be accelerations, pressures, flows, etc.

As can be observed below, the preferred embodiments of the invention shown in the FIGS. include a combination of several alternatives and options previously explained, although those in the art will be able to see that they are alternatives and options that can be mutually combined in different ways.

Figure 8:
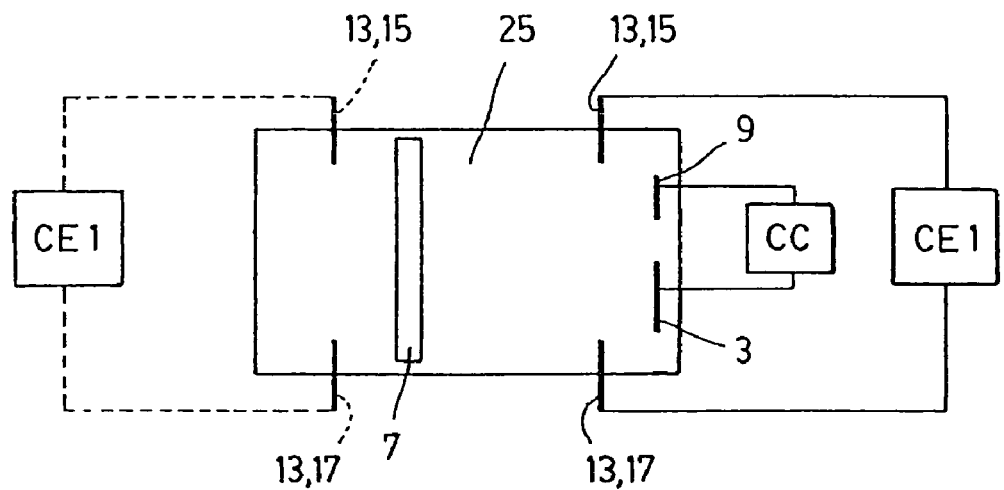
FIG. 8, a simplified diagram of a relay with two condenser plates in the second zone thereof.

FIG. 8 shows a first basic functioning mode of a relay according to the invention. The relay defines an intermediate space 25 in which is housed a conductive element 7, which can move freely along the intermediate space 25, since physically it is a detached part which is not physically joined to the walls which define the intermediate space 25. The relay also defines a first zone, on the left in FIG. 8, and a second zone, on the right in FIG. 8. In the second zone are arranged a first condenser plate 3 and a second condenser plate 9. In the example shown in FIG. 8 both condenser plates 3 and 9 have different surface areas, although they can be equal with respect to one another. The first condenser plate 3 and the second condenser plate 9 are connected to a CC control circuit. Applying a voltage between the first condenser plate 3 and the second condenser plate 9, the conductive element is always attracted towards the right in FIG. 1, towards the condenser plates 3 and 9. The conductive element 7 will be moved towards the right until being stopped by first stops 13, which are a first contact point 15 and a second contact point 17 of a first external electric circuit CE1, such that the first external electric circuit CE1 is closed.

Figure 9:
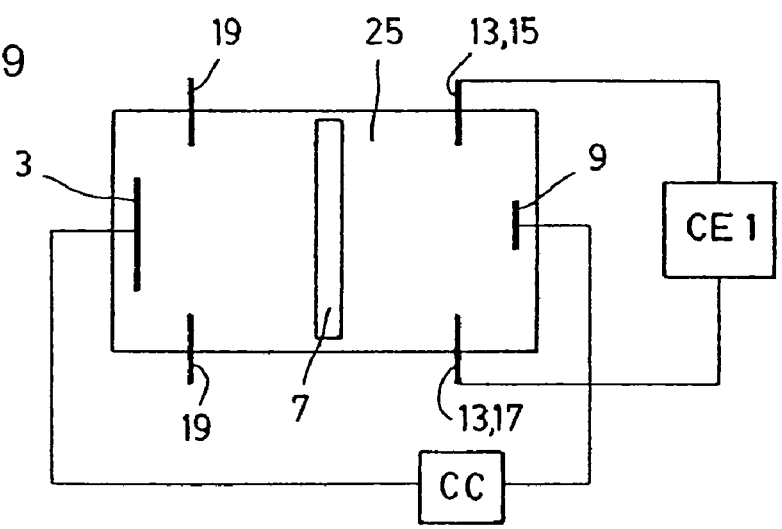
FIG. 9, a simplified diagram of a relay with two condenser plates, one in each of the zones thereof.

FIG. 9 shows a second basic functioning mode for a relay according to the invention. The relay again defines an intermediate space 25 in which is housed a conductive element 7, which can move freely along the intermediate space 25, a first zone, on the left in FIG. 2, and a second zone, on the right in FIG. 9. In the second zone is arranged a second condenser plate 9 whilst in the first zone is arranged a first condenser plate 3. The first condenser plate 3 and the second condenser plate 9 are connected to a CC control circuit. Applying a voltage between the first condenser plate 3 and the second condenser plate 9, the conductive element is always attracted to the right of the FIG. 9, towards the smallest condenser plate, i.e. towards the second condenser plate 9. For this reason, the fact that in the example shown in FIG. 2 both condenser plates 3 and 9 have different surface areas is, in this case, absolutely necessary, since if they were to have equal surface areas, the conductive element 7 would not move in any direction. The conductive element 7 will move towards the right until being stopped by first stops 13, which are a first contact point 15 and a second contact point 17 of a first external electric circuit CE1, such that the first external electric circuit CE1 is closed. On the left there are second stops 19 which in this case do not serve any electric function but which stop the conductive element 7 from entering into contact with the first condenser plate 3. In this case the stops 19 can be removed, since no problem is posed by the conductive element 7 entering into contact with the first condenser plate 3. This is because there is only one condenser plate on this side, if there had been more than one and if they had been connected to different voltages then the stops would have been necessary to avoid a short-circuit.

The configurations of the relays of FIGS. 8 and 9 are suitable for being used as sensors, in which the magnitude to be measured exercises a force which is that which will be counteracted by the electrostatic force induced in the conductive element 7, although they could be used as relays as long as there is an external force (acceleration, pressure, etc.) capable of moving the conductive element 7. Such as represented, in both cases the magnitude to be measured must exercise a force tending to open the electric circuit CE1, whilst the electrostatic force will tend to close it. However, a relay can be designed to work exactly in the opposite respect: such that the magnitude to be measured would tend to close the electric circuit CE1 whilst the electrostatic force would tend to open it. In this case, the first stops 13 would need to be positioned on the left in FIGS. 8 and 9, together with the corresponding electric circuit CE1. In FIG. 8 this possibility has been shown in a broken line.

Figure 10:
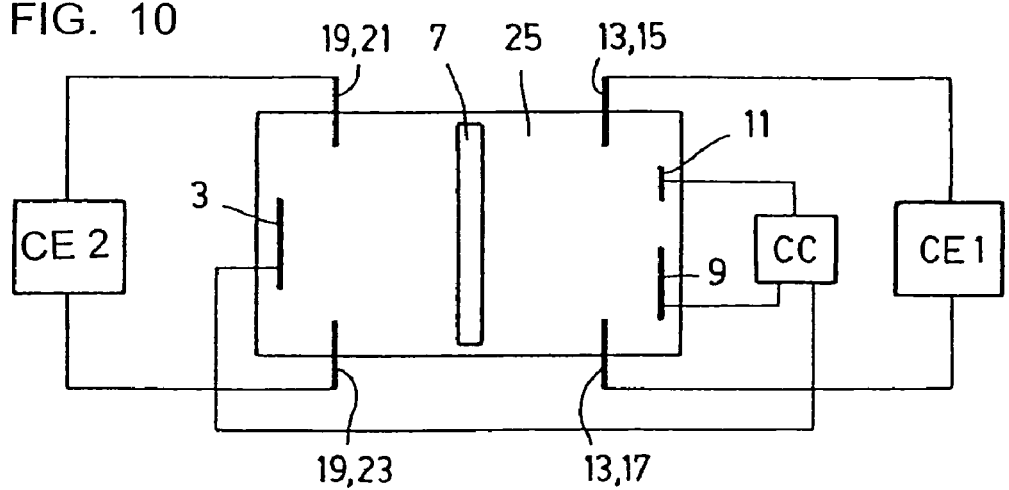
FIG. 10, a simplified diagram of a relay with three condenser plates.

To achieve moving the conductive element 7 in both directions by means of electrostatic forces, it is necessary to provide a third condenser plate 11, as shown in FIG. 10. Given that the conductive element 7 will always move towards where the smallest condenser plate is located, it is necessary, in this case, that the third condenser plate 11 be smaller than the first condenser plate 3, but that the sum of the surface areas of the second condenser plate 9 and the third condenser plate 11 be larger than the first condenser plate 3. In this manner, activating the first condenser plate 3 and the second condenser plate 9, connecting them to different voltages, but not the third condenser plate 11, which will remain in a state of high impedance, the conductive element 7 can be moved to the right, whilst activating the three condenser plates 3, 9 and 1 the conductor element 7 can be moved to the left. In the latter case the second condenser plate 9 and the third condenser plate 11 are supplied at a same voltage, and the first condenser plate 3 at a different voltage. The relay of FIG. 10 has, in addition, a second external electric circuit CE2 connected to the second stops 19, in a manner that these second stops 19 define a third contact point 21 and a fourth contact point 23.

Should two condenser plates be provided in each of the first and second zones, the movement of the conductive element 7 can be solicited in two different ways:
  applying a voltage between the two condenser plates of a same zone, so that the conductive element is attracted by them (functioning as in FIG. 8)
  applying a voltage between one condenser plate of one zone and a (or both) condenser plate(s) of the other zone, such that the conductive element 7 is attracted towards the zone in which the electrically charged condenser surface area is smallest (functioning as in FIG. 9).

Figure 11:
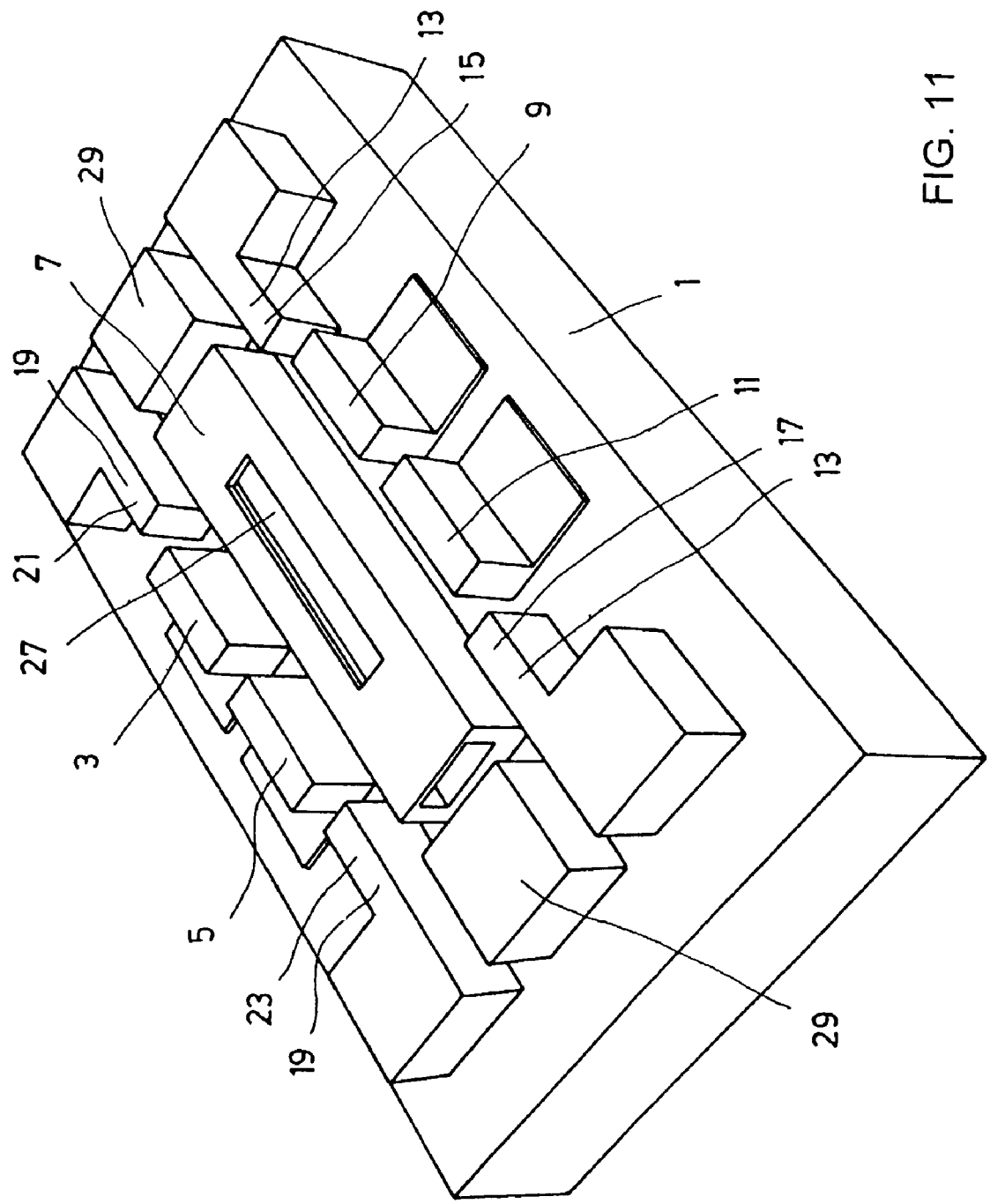
FIG. 11, a perspective view of a first embodiment of a relay according to the invention, uncovered.
Figure 12:
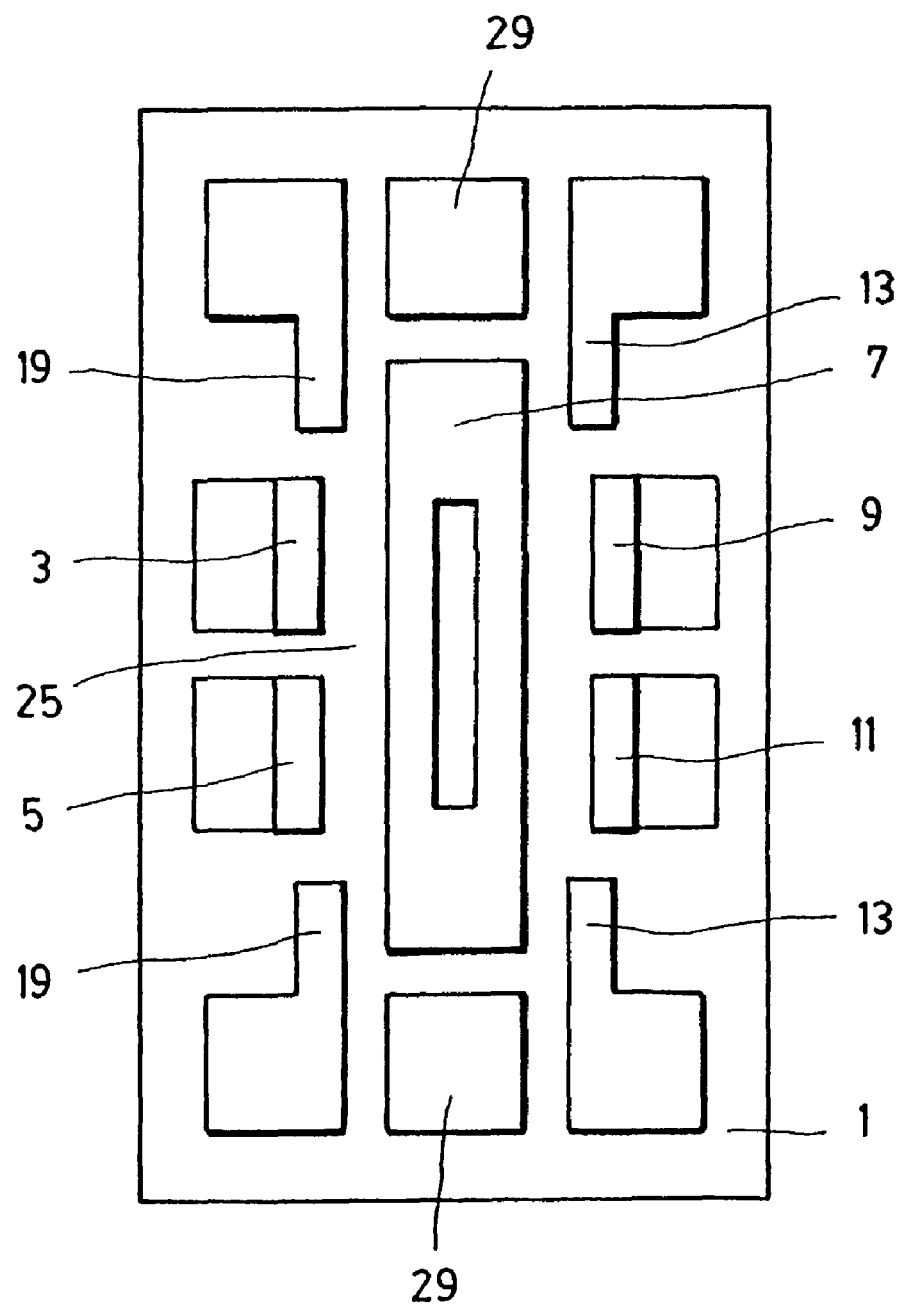
FIG. 12, a plan view of the relay of FIG. 11.

FIGS. 11 and 12 illustrate a relay designed to be manufactured with EFAB technology. This micromechanism manufacturing technology by means of layer depositing is known by persons skilled in the art, and allows the production of several layers and presents a great deal of versatility in the design of three-dimensional structures. The relay is mounted on a substrate 1 which serves as support, and which in several of the appended drawings has not been illustrated in the interest of simplicity. The relay has a first condenser plate 3 and a fourth condenser plate 5 arranged on the left (according to FIG. 12) of a conductive element 7, and a second condenser plate 9 and a third condenser plate 11 arranged on the right of the conductive element 7. The relay also has two first stops 13 which are the first contact point 15 and the second contact point 17, and two second stops 19 which are the third contact point 21 and the fourth contact point 23. The relay is covered in its upper part, although this cover has not been shown in order to be able to clearly note the interior details.

The relay goes from left to right, and vice versa, according to FIG. 12, along the intermediate space 25. As can be observed the first stops 13 and the second stops 19 are closer to the conductive element 7 than the condenser plates 3, 5, 9 and 11. In this manner the conductive element 7 can move from left to right, closing the corresponding electric circuits, without interfering with the condenser plates 3, 5, 9 and 11, and their corresponding control circuits.

The conductive element 7 has a hollow internal space 27.

There is play between the conductive element 7 and the walls which form the intermediate space 25 (which is to say the first stops 13, the second stops 19, the condenser plates 3, 5, 9 and 11 and the two lateral walls 29) which is sufficiently small to prevent the conductive element 7 from spinning along an axis perpendicular to the plane of the drawing of FIG. 12 enough to contact the first contact point 15 with the third contact point 21 or the second contact point 17 with the fourth contact point 23. In the figures, however, the play is not drawn to scale, so as to allow greater clarity in the figures.

Figure 13:
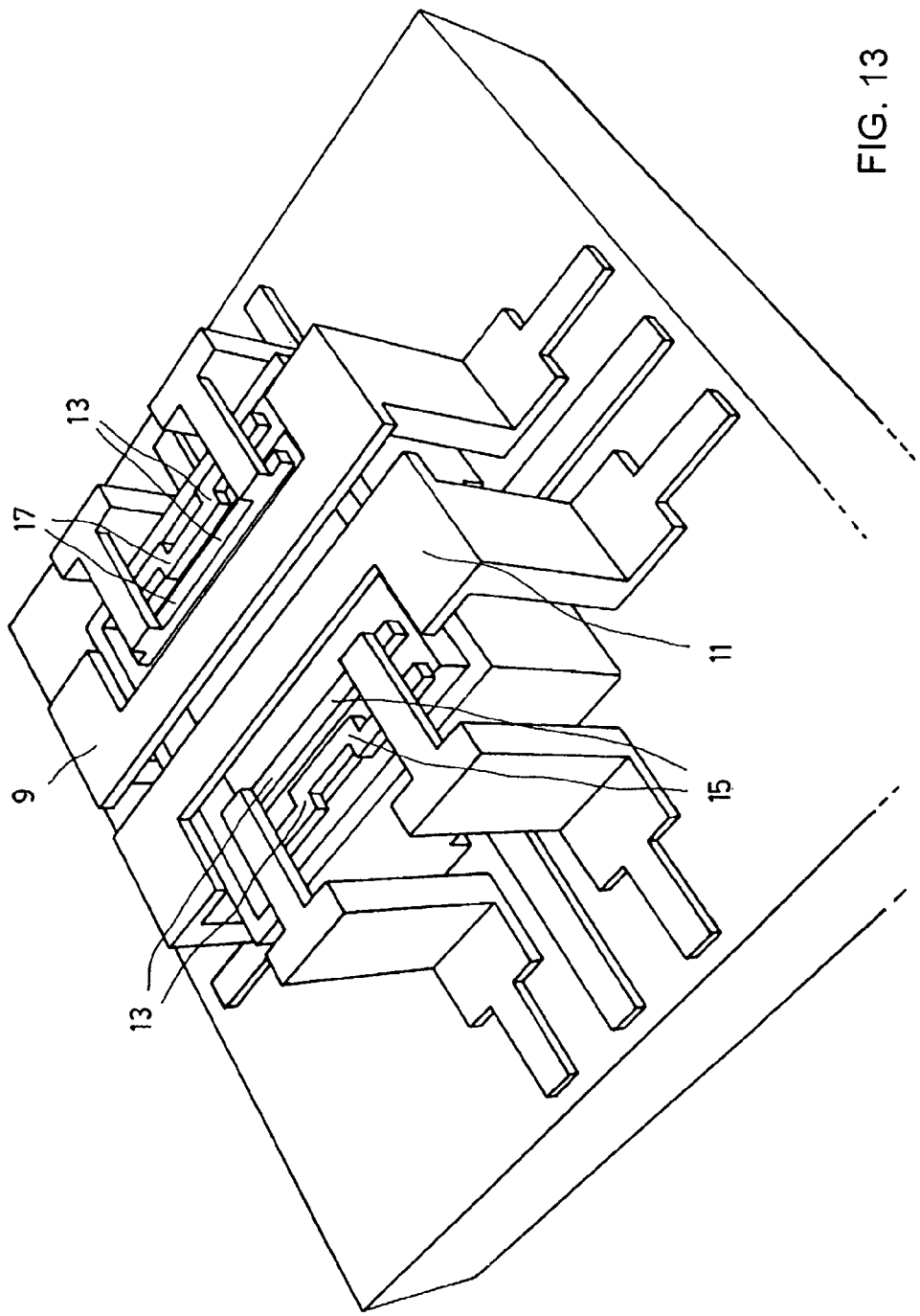
FIG. 13, a perspective view of a second embodiment of a relay according to the invention.
Figure 14:
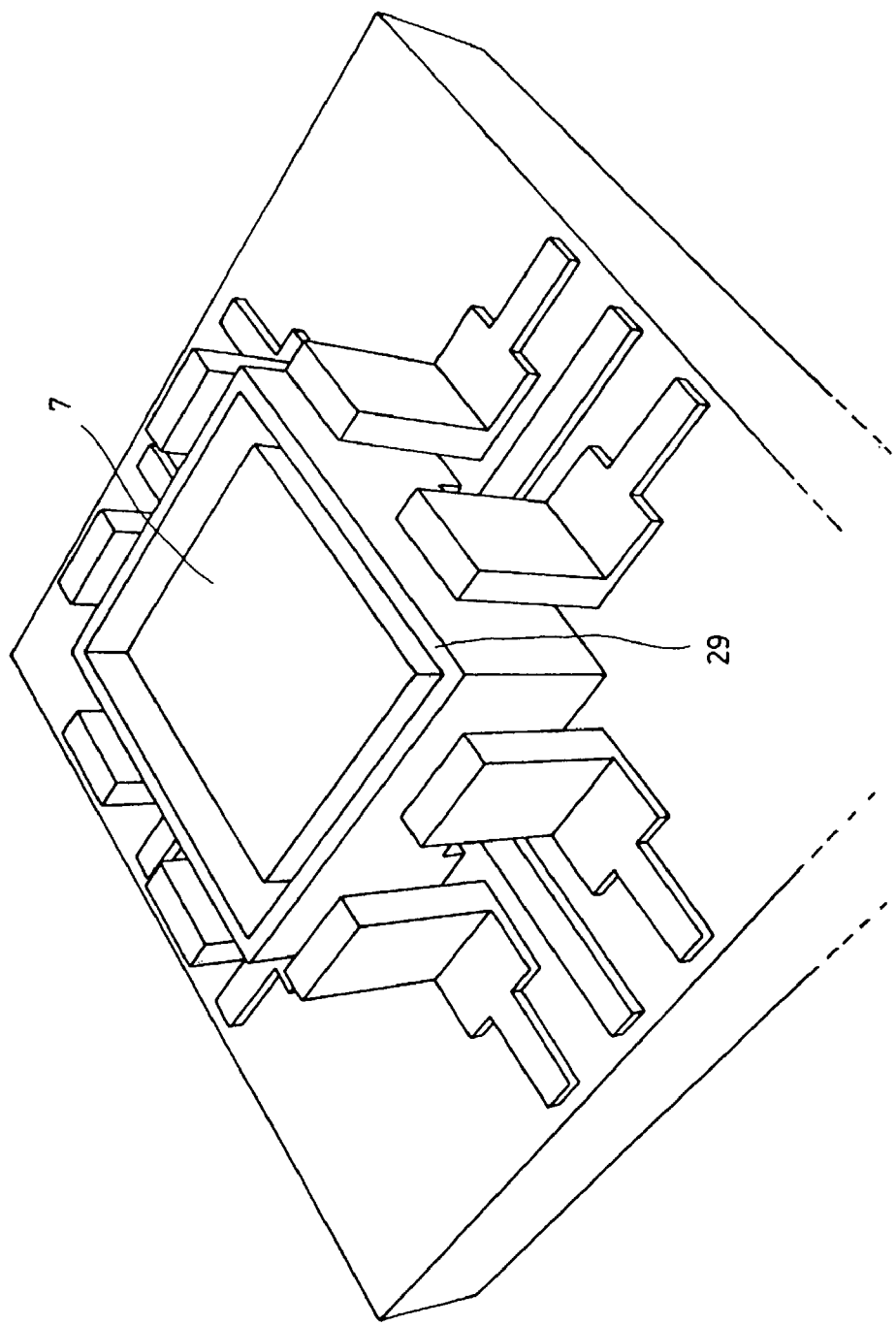
FIG. 14, a perspective view of the relay of FIG. 13 from which the components of the upper end have been removed.
Figure 15:
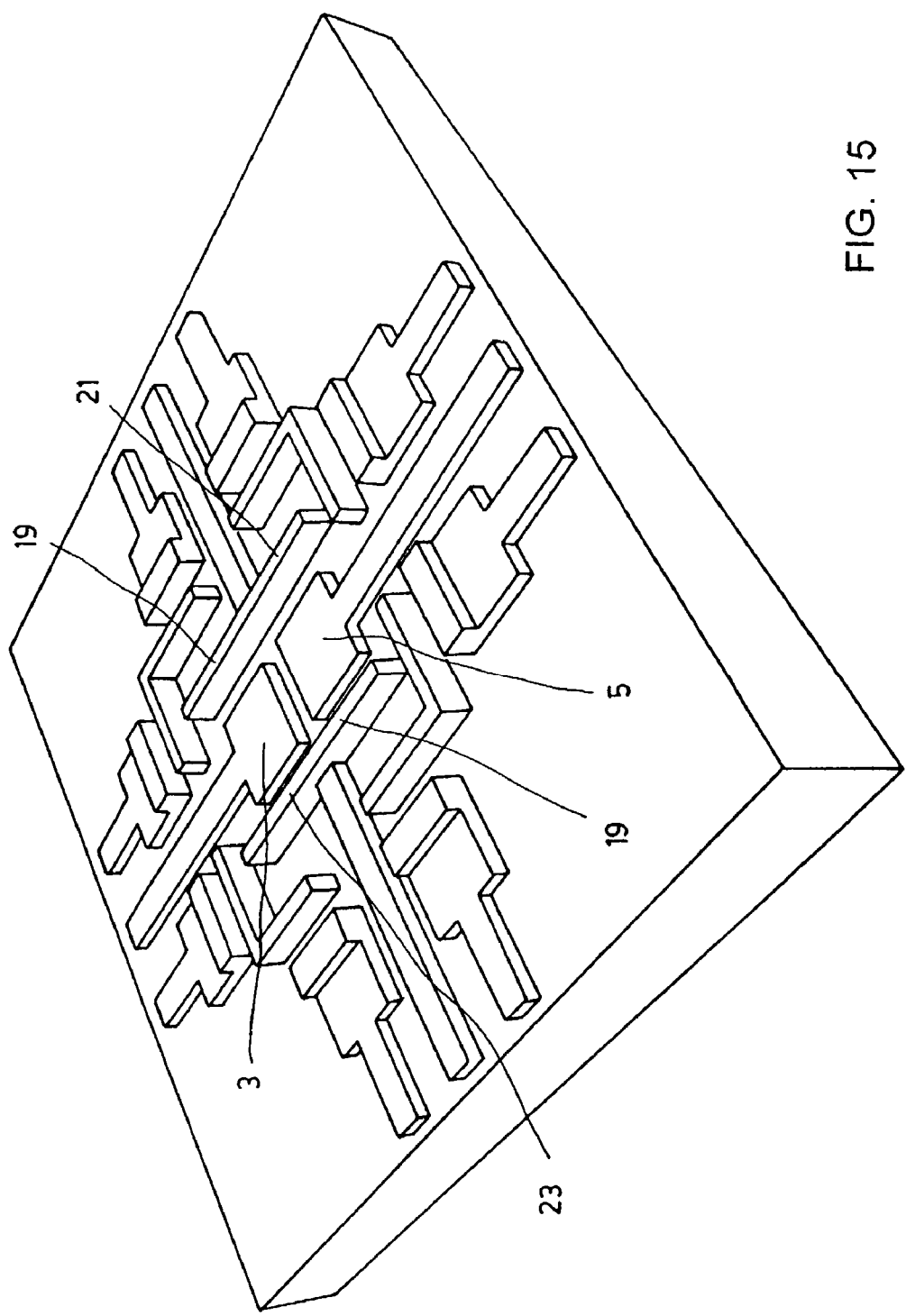
FIG. 15, a perspective view of the lower elements of the relay of FIG. 13.

FIGS. 13 to 15 show another relay designed to be manufactured with EFAB technology. In this case the conductive element 7 moves vertically, in accordance with FIGS. 13 to 15. The use of one or the other movement alternative in the relay depends on design criteria. The manufacturing technology consists in the deposit of several layers. In all figures the vertical dimensions are exaggerated, which is to say that the physical devices are much flatter than as shown in the figures. Should one wish to obtain larger condenser surfaces it would be preferable to construct the relay with a form similar to that shown in the FIGS. 13 to 15 (vertical relay), whilst a relay with a form similar to that shown in FIGS. 11 and 12 (horizontal relay) would be more appropriate should a lesser number of layers be desired. Should certain specific technologies be used (such as those usually known as polyMUMPS, Dalsa, SUMMIT, Tronic's, Qinetiq's, etc) the number of layers will always be limited. The advantage of a vertical relay is that larger surfaces are obtained with a smaller chip area, and this implies much lower activation voltages (using the same chip area).

Conceptually the relay of FIGS. 13 to 15 is very similar to the relay of FIGS. 11 and 12, and has the first condenser plate 3 and the fourth condenser plate 5 arranged in the lower part (FIG. 15) as well as the second stops 19 which are the third contact point 21 and the fourth contact point 23. As can be seen in the drawings the second stops 19 are above the condenser plates, such that the conductive element 7 can bear on the second stops 19 without entering into contact with the first and fourth condenser plates 3, 5. In the upper end (FIG. 13) is the second condenser plate 9, the third condenser plate 11 and two first stops 13 which are the first contact point 15 and the second contact point 17. In this case the play between the conductive element 7 and the lateral walls 29 is also sufficiently small to avoid the first contact point 15 contacting with the third contact point 21 or the second contact point 17 contacting with the fourth contact point 23.

Figure 16:
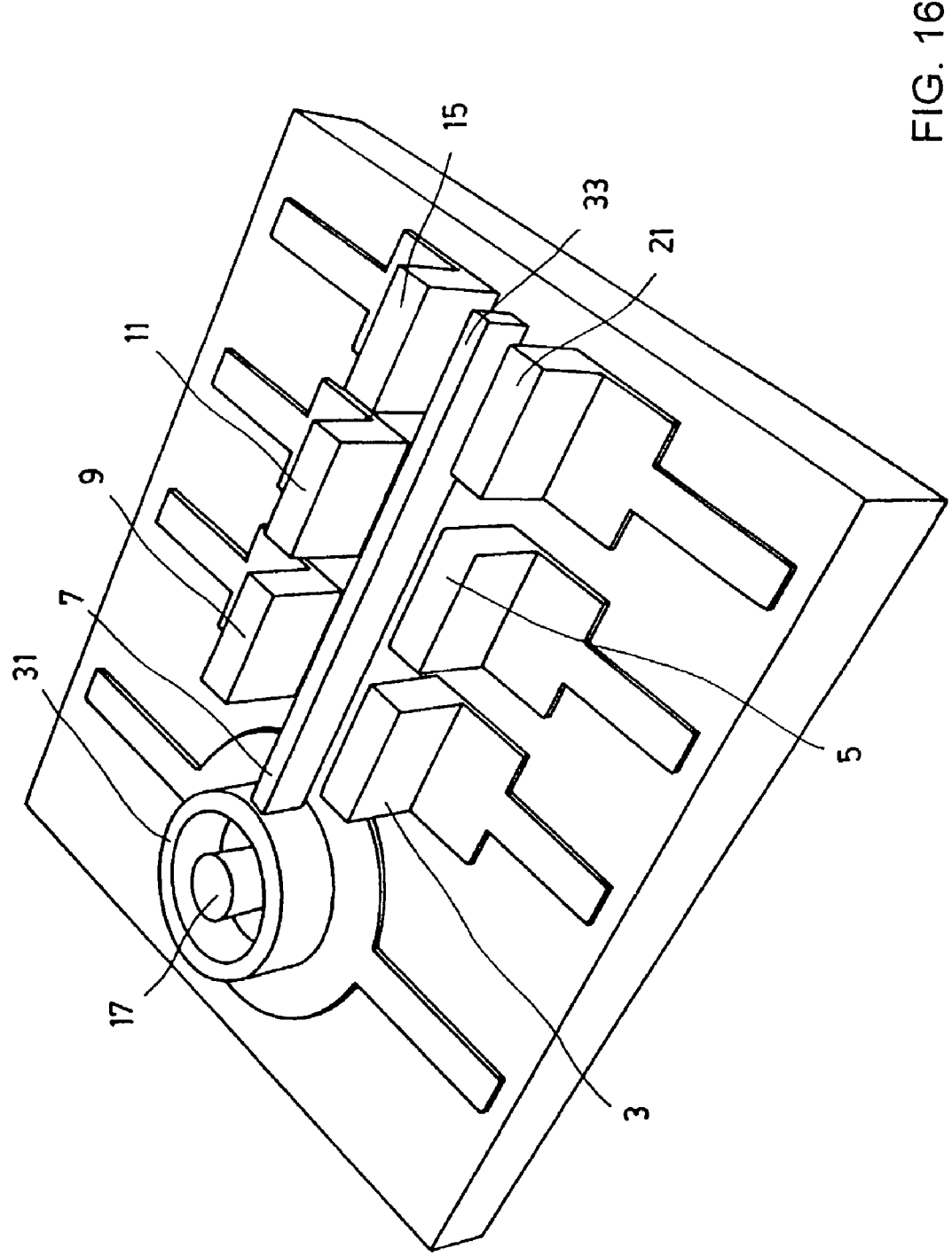
FIG. 16, a perspective view of a third embodiment of a relay according to the invention, uncovered.
Figure 17:
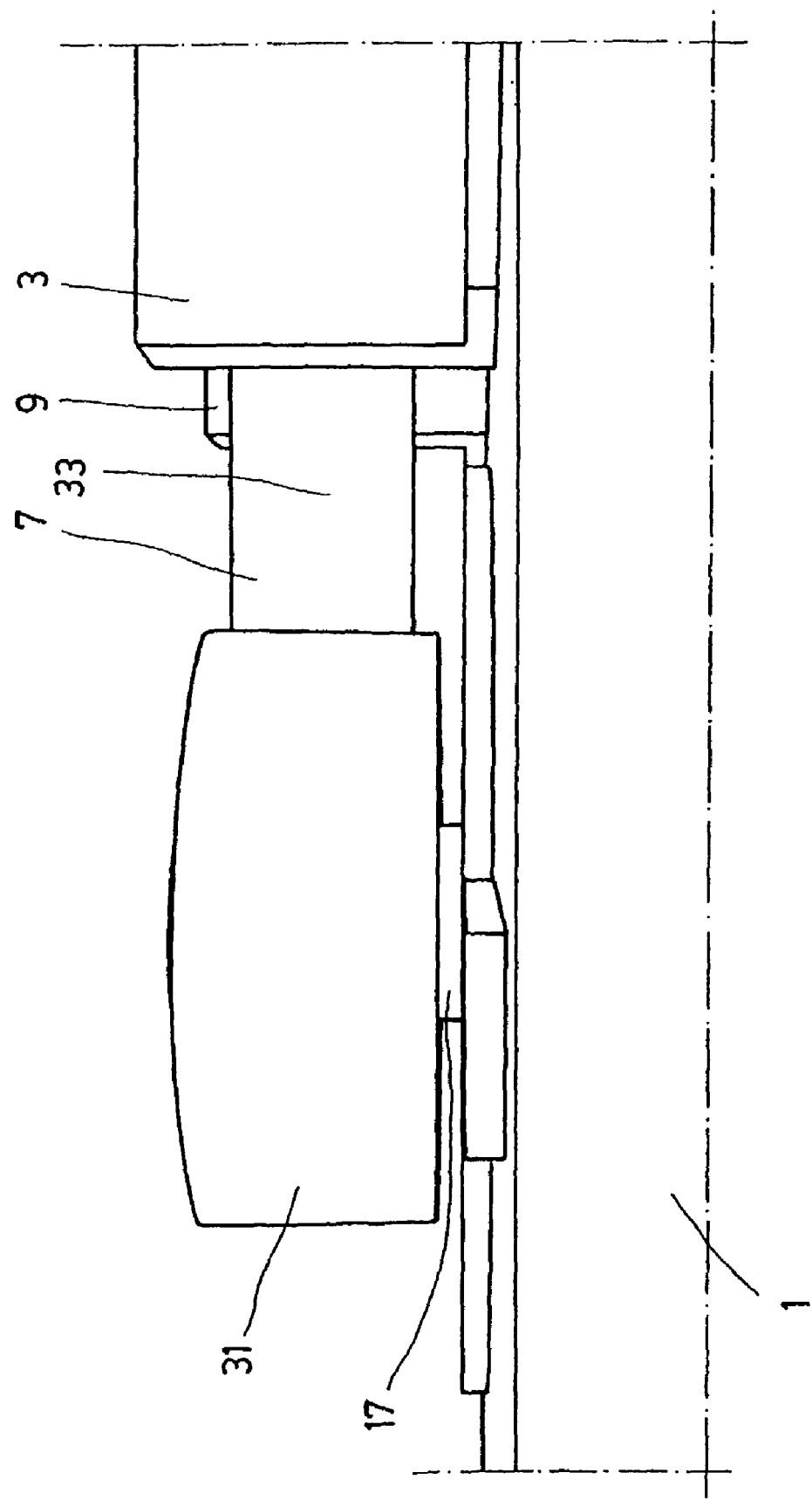
FIG. 17, a perspective view, in detail, of the cylindrical part of the relay of FIG. 16.

The relay shown in FIGS. 16 and 17 is an example of a relay in which the movement of the conductive element 7 is substantially a rotation around one of its ends. This relay has a first condenser plate 3, a second condenser plate 9, a third condenser plate 11 and a fourth condenser plate 5, all mounted on a substrate 1. Additionally there is a first contact point 15 and a third contact point 21 facing each other. The distance between the first contact point 15 and the third contact point 21 is less than the distance between the condenser plates. The conductive element 7 has a cylindrical part 31 which is hollow, in which the hollow is likewise cylindrical.

In the interior of the cylindrical hollow is housed a second contact point 17, having a cylindrical section.

In this manner the conductive element 7 will establish an electrical contact between the first contact point 15 and the second contact point 17 or the third contact point 21 and the second contact point 17. The movement performed by the conductive element 7 is substantially a rotation around the axis defined by the cylindrical part 31. The play between the second contact point 17 and the cylindrical part 31 is exaggerated in the FIG. 16, however it is certain that a certain amount of play exists, the movement performed by the conductive element 7 thus not being a pure rotation but really a combination of rotation and translation.

From the cylindrical part 31 extends a flat part 33 which has a lesser height than the cylindrical part 31, measured in the direction of the axis of said cylindrical part 31. This can be observed in greater detail in FIG. 17, in which is shown a view almost in profile of the cylindrical part 31 and the flat part 33. In this manner one avoids the flat part 33 entering into contact with the substrate 1, which reduces the frictional forces and sticking.

As can be seen, substituting a parallelepipedic part for the cylindrical part 31 and replacing the second contact point 17 having a circular section by one having a quadrangular section, as long as play is sufficient, one can design a relay which is conceptually equivalent to that of FIGS. 16 and 17.

If, for example, in the relay shown in FIGS. 16 and 17 the first contact point 15 and/or the third contact point 21 were eliminated, then it would be the very condenser plates (specifically the third condenser plate 11 and the fourth condenser plate 5) which would serve as contact points and stops. By means of a suitable choice of voltages at which the condenser plates must work one can obtain that this voltage be always VCC or GND. Another possibility would be, for example, that the third contact point 21 were not electrically connected to any external circuit. Then the third contact point would only be a stop, and when the conductive element 7 contacts the second contact point 17 with the third contact point 21, the second contact point 17 would be in a state of high impedance in the circuit.

Figure 18:
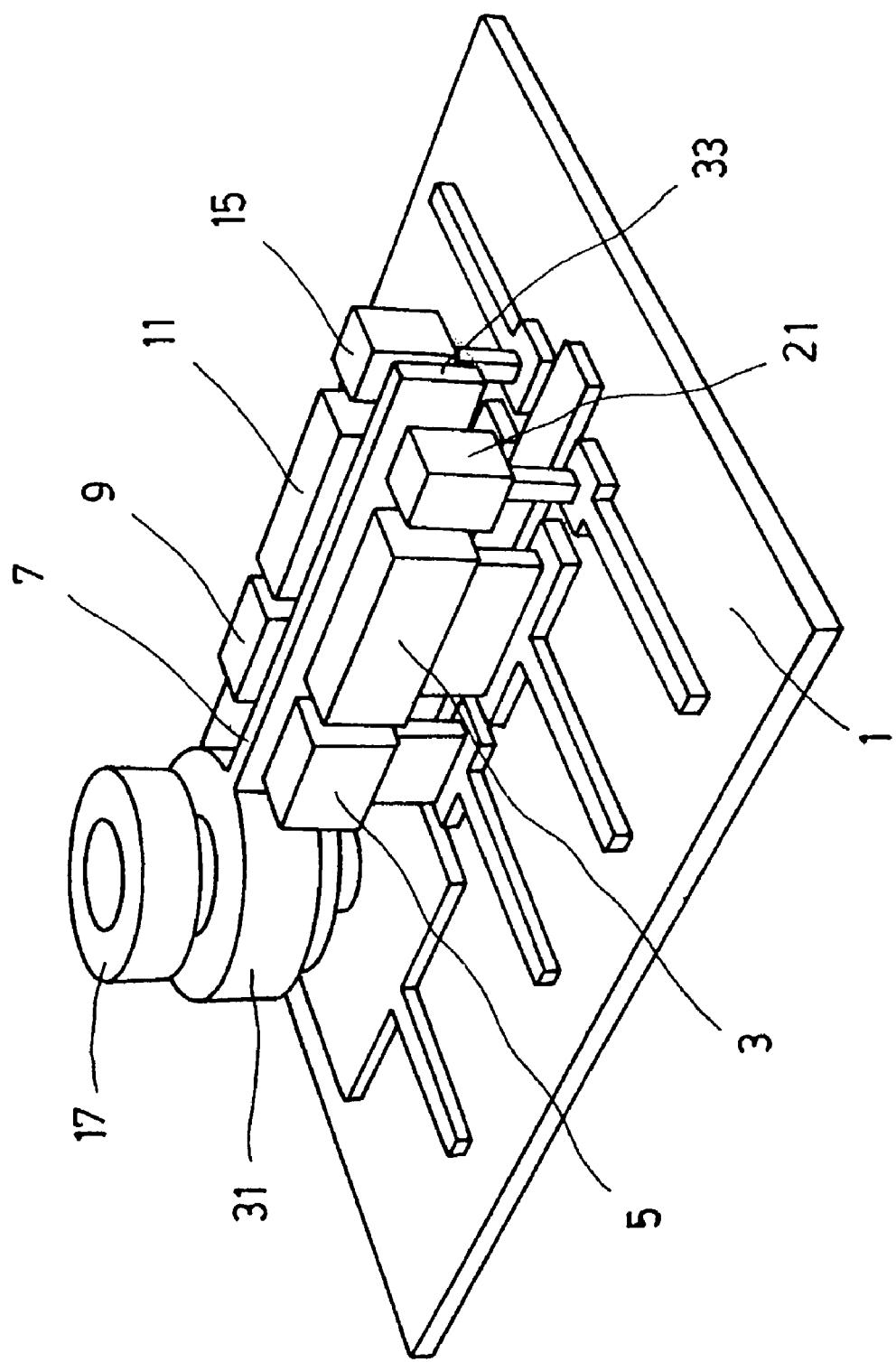
FIG. 18, a perspective view of a fourth embodiment of a relay according to the invention.

The relay shown in FIG. 18, is designed to be manufactured with polyMUMPS technology. As already mentioned, this technology is known by a person skilled in the art, and is characterized by being a surface micromachining with three structural layers and two sacrificial layers. However, conceptually it is similar to the relay shown in FIGS. 16 and 17, although there are some differences. Thus in the relay of FIG. 18 the first condenser plate 3 is equal to the third condenser plate 11, but is different from the second condenser plate 9 and the fourth condenser plate 5, which are equal to each other and smaller than the former. With respect to the second contact point 17 it has a widening at its upper end which permits retaining the conductive element 7 in the intermediate space 25. The second contact point 17 of FIGS. 16 and 17 also can be provided with this kind of widening. It is also worth noting that in this relay the distance between the first contact point 15 and the third contact point 21 is equal to the distance between the condenser plates. Given that the movement of the conductive element 7 is a rotational movement around the second contact point 17, the opposite end of the conductive element describes an arc such that it contacts with first or third contact point 15, 21 before the flat part 33 can touch the condenser plates.

Figure 19:
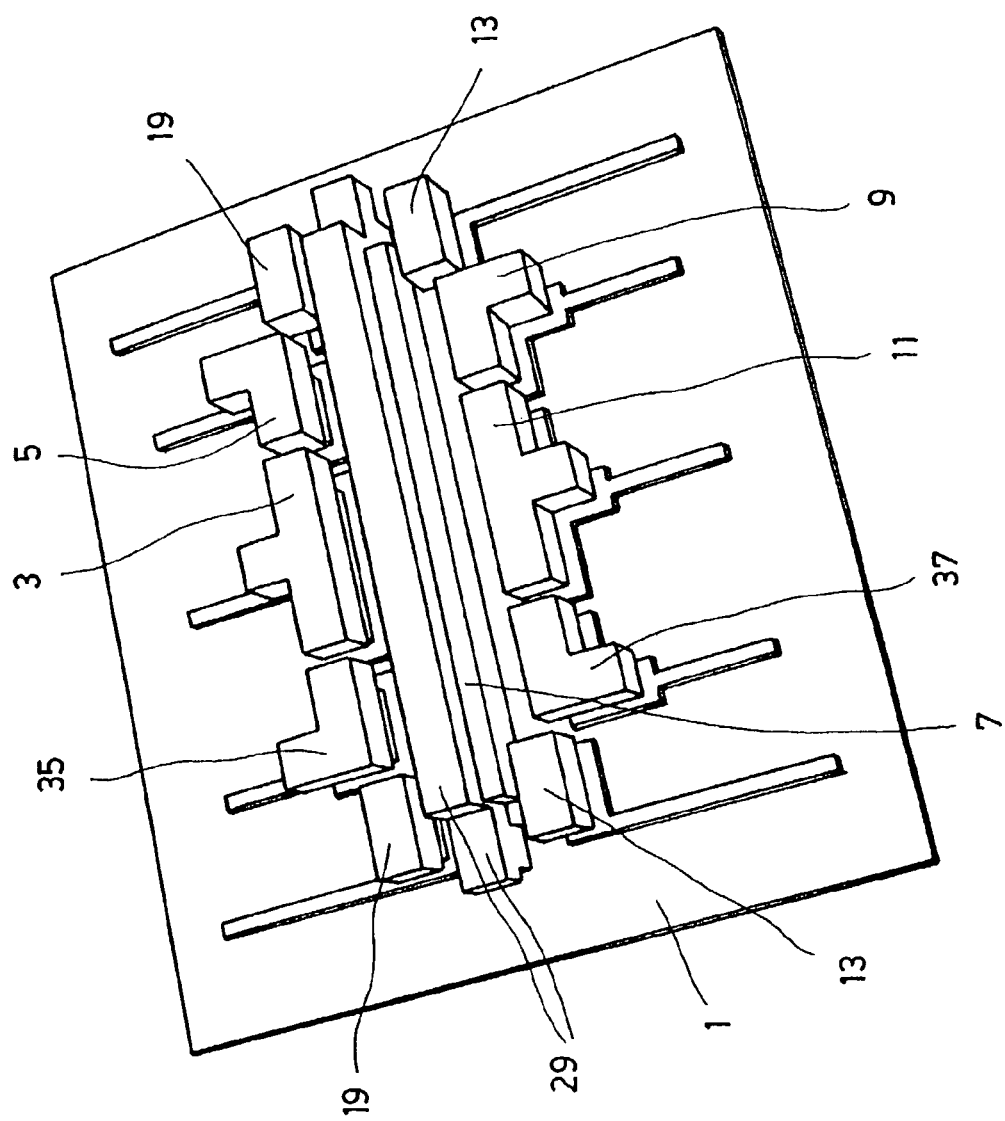
FIG. 19, a perspective view of a fifth embodiment of a relay according to the invention.

FIG. 19 shows another relay designed to be manufactured with polyMUMPS technology. This relay is similar to the relay of FIGS. 11 and 12, although it has, additionally, a fifth condenser plate 35 and a sixth condenser plate 37.

Figure 20:
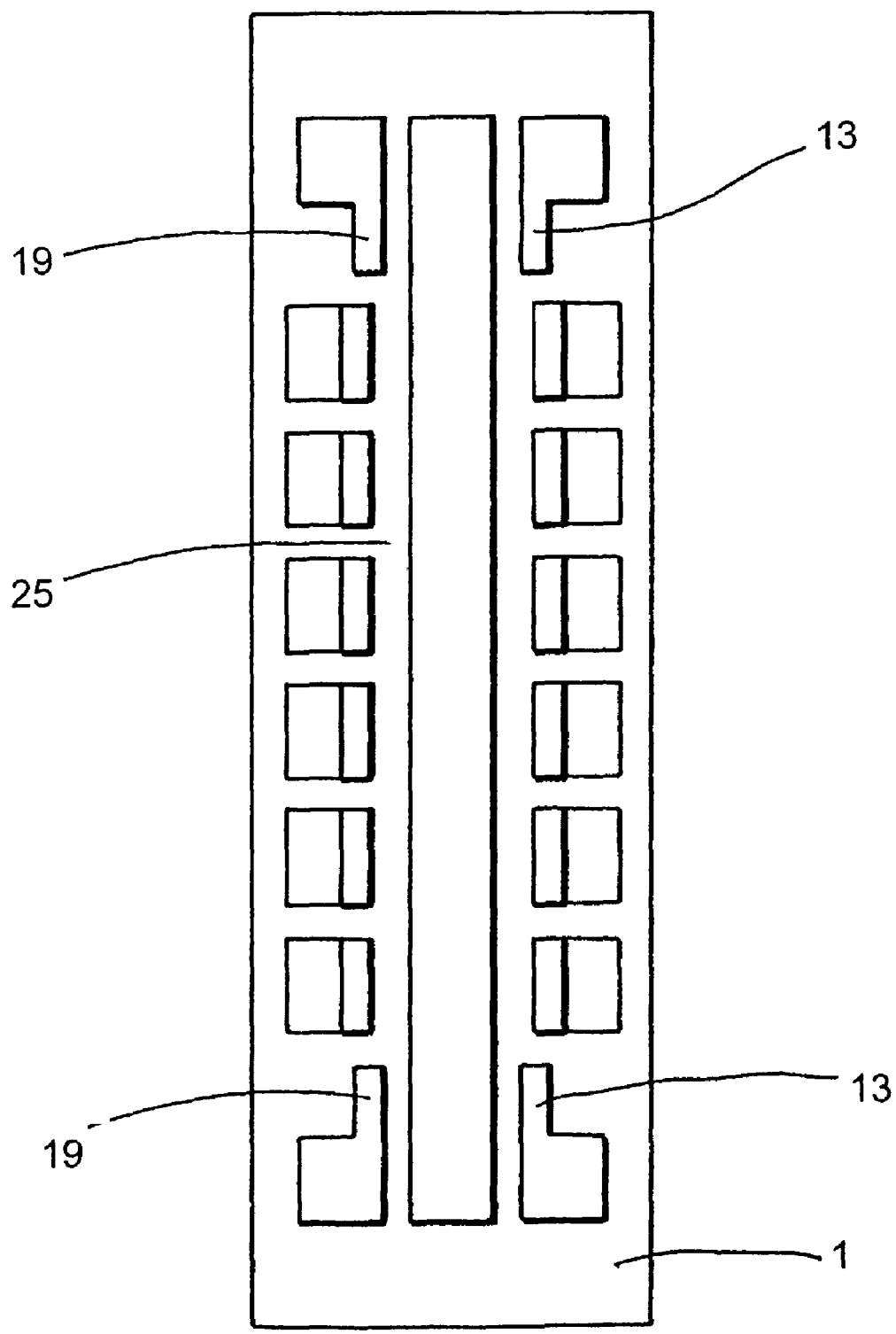
FIG. 20, a plan view of a sixth embodiment of a relay according to the invention.

FIG. 20 illustrates a relay equivalent to that shown in FIGS. 11 and 12, but which has six condenser plates in the first zone and six condenser plates in the second zone. Additionally, one should note the upper cover which avoids exit of the conductive element 7.

Figure 21:
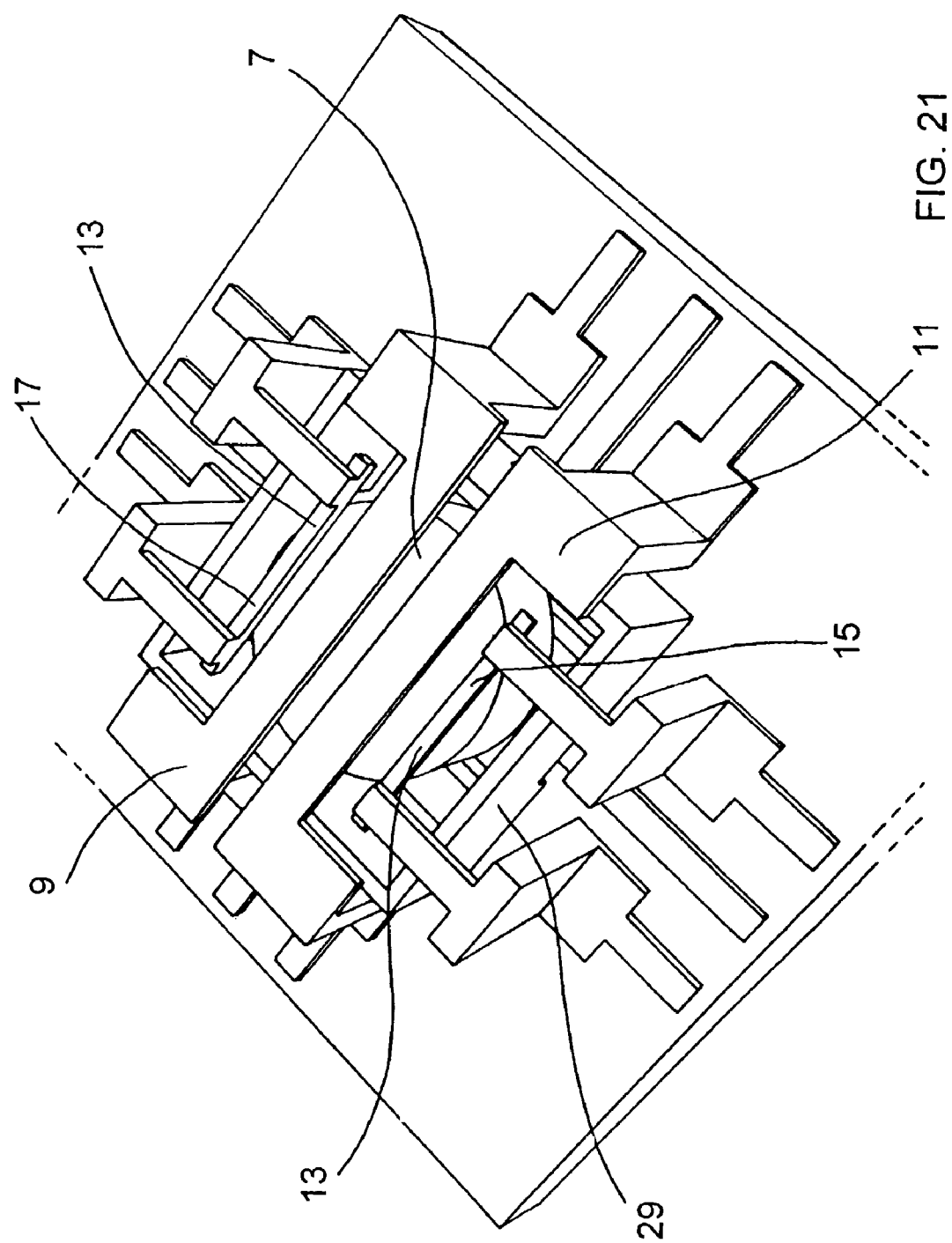
FIG. 21, a perspective view of a seventh embodiment of a relay according to the invention.
Figure 22:
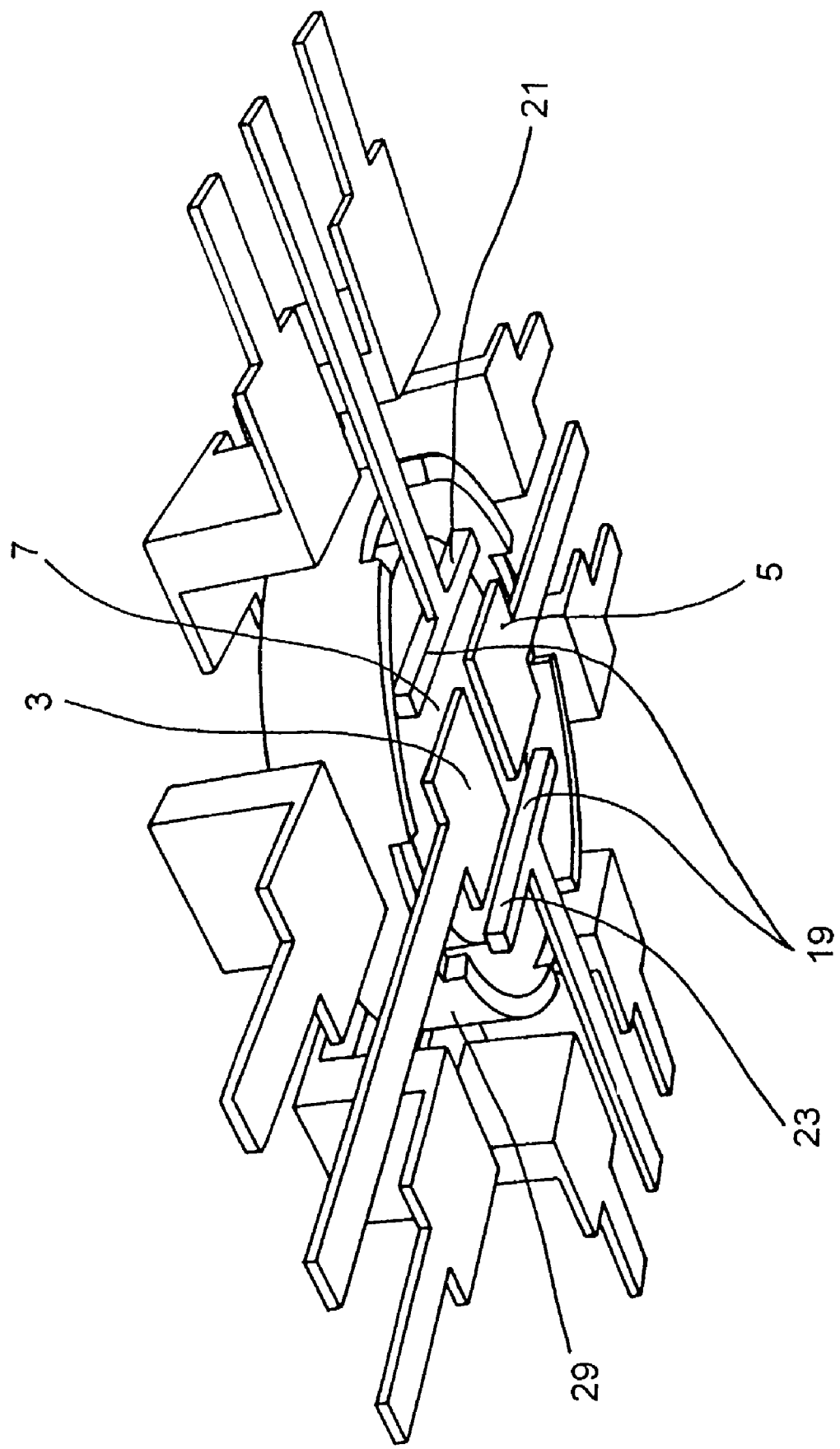
FIG. 22, a perspective view from below, without substrate, of an eighth embodiment of a relay according to the invention.
Figure 23:
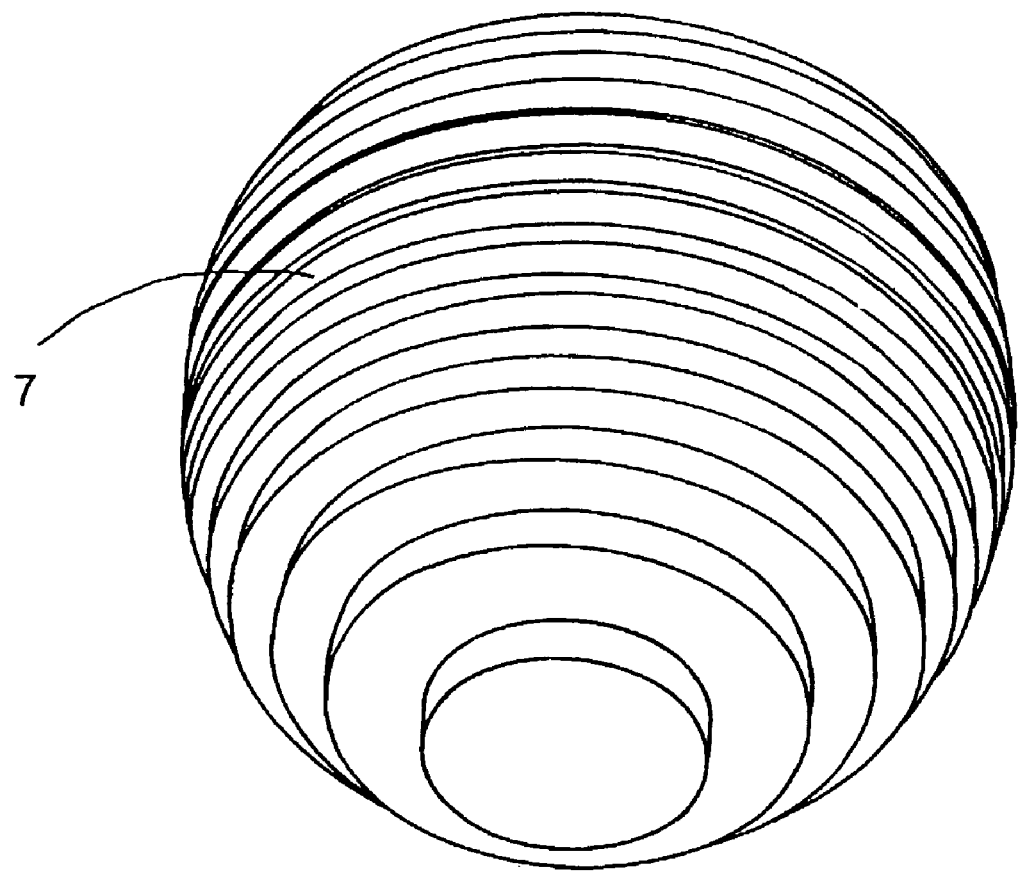
FIG. 23, a sphere produced with surface micromachining.

FIGS. 21 and 22 illustrate a relay in which the conductive element 7 is cylindrical. Referring to the relay of FIG. 21, the lateral walls 29 which surround the conductive element are parallelepipedic, whilst in the relay of FIG. 22 the lateral walls 29 which surround the conductive element 7 are cylindrical with a circular cross section. With respect to FIG. 23, it shows a sphere manufactured by means of surface micromachining, it being noted that it is formed by a plurality of cylindrical discs of varying diameters. A relay with a spherical conductive element 7 such as that of FIG. 23 can be, for example, very similar conceptually to that of FIGS. 21 or 22 replacing the cylindrical conductive element 7 by a spherical one. Should be taken into account however certain geometric adjustments in the arrangement of the condenser plates and the contact points in the upper end, to avoid spherical conductive element 7 first touching the condenser plates and not the contact points or, as the case may be, the corresponding stops.

Figure 24:
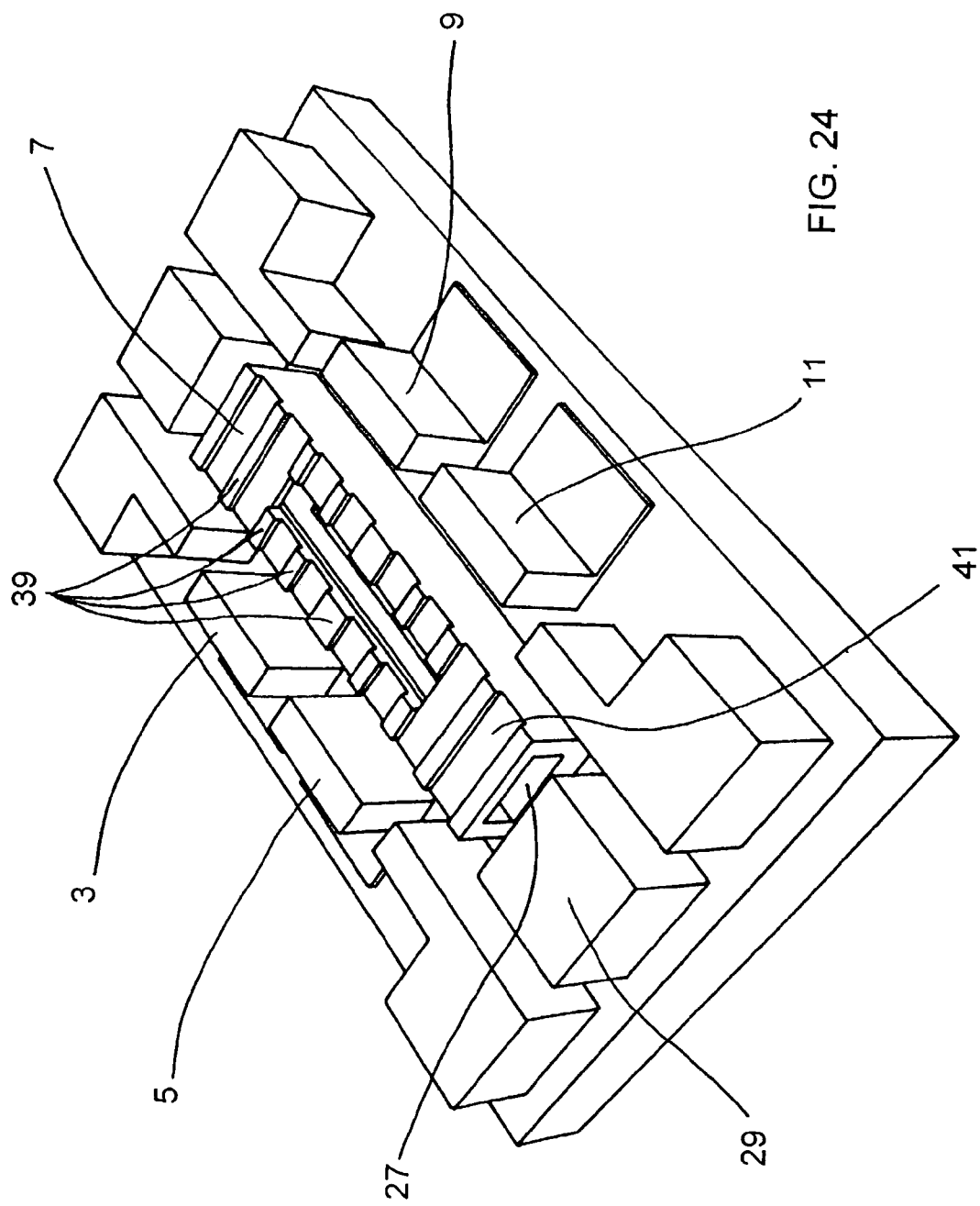
FIG. 24, a perspective view of a ninth embodiment of a relay according to the invention.

FIG. 24 shows a variant of the relay illustrated in FIGS. 11 and 12. In this case the conductive element 7 has protuberances 39 in its lateral faces 41.

Different preferred embodiments of the normally-off and normally-on relays, using miniaturized relays according to the invention are possible:

a normally-off relay formed by one of the miniaturized relays according to the invention the conductive element of which is formed with a material with a contact energy high enough to compensate its weight. In fact, in this manner the relay will be always in the position on which it was positioned the last time. Actually, exactly the same concept can be used for a normally-on relay. It must be only taken into account that it is advisable that the regulator circuit comprises a detecting power failure module and that could position these relays in their corresponding positions before the equipment is completely turned off. Preferably the contact energy is high enough to also resist impacts, vibrations and other accelerations that can be foreseen during the equipment use.

a normally-off relay comprising two miniaturized relays according to the invention, connected in series, wherein the first miniaturized relay has a first conductive element suitable for moving in the space according to a first direction, and wherein the second miniaturized relay is rotated 180° with respect to the first miniaturized relay according to an axis perpendicular to a first direction, so that the two conductive elements of both miniaturized relays are suitable for being moved in the same direction, but they must be moved in opposite directions in order to reach the same connection or disconnection state. In this manner it is ensured that if one of the relays is closed then the other one, that will have the conductive element in the same side, will be opened. By connecting both relays in series, it is then ensured that the assembly works as normally-off relay. FIG. 25 shows a diagram of a normally-off relay of this type.

variants of the previous concept consist in adding a second normally-off relay equal to the first one, but arranged in the space so that its conductive elements move according to a second direction perpendicular to said first direction, and even adding a third normally-off relay equal to the previous ones but arranged in the space so that its conductive elements move according to a third direction perpendicular to said first and second direction. In this manner a normally-off relay suitable for working in a tridimensional environment.

with the same idea of the previous normally-off relay a normally-on relay can be designed. To this end the normally-on relay comprises two miniaturized relays according to the invention, in this case connected in parallel, wherein the first miniaturized relay has first conductive element suitable for moving in the space according to a first direction, and wherein the second miniaturized relay is rotated 180° with respect to the first miniaturized relay according to an axis perpendicular to a first direction, so that the two conductive elements of both miniaturized relays are suitable for being moved in the same direction, but they must be moved in opposite directions in order to reach the same connection or disconnection state. In this case, by connecting them in parallel it is ensured that at least one of them is connected, whereby the assembly works as a normally-on relay.

also in this case a second normally-on relay equal to the first can be added, but arranged in the space so that its conductive elements move according to a second direction perpendicular to said first direction, and even adding a third normally-on relay equal to the previous ones, but arranged in the space so that its conductive elements move according to a third direction perpendicular to said first and second directions. In this manner a normally-on relay suitable for working in a tridimensional environment is obtained.

These examples of normally-on and normally-off miniaturized relays can be combined:

the normally-off relays formed by two series relays can be combined in series with the same orientation, so that there are various miniaturized series relays for each orientation, ensuring thereby that at least one of them will be open.

Analogously, the normally-on relays can be combined in parallel with the same orientation, so that there are various parallel relays for each orientation, ensuring thereby that at least one of them is closed.

anyway, the idea of miniaturized relays oriented in the space can be combined with the idea of miniaturized relays made of a material with high contact energies.

The subject of the present invention is both these normally-off relays and normally-on relays as such, as regulators circuits comprising normally-off and/or normally-on relays as those described.

The invention claimed is:

1. Regulator circuit, comprising:
   at least two input terminals;
   at least a first group of reactances with at least two reactances, wherein said reactances are condensers;
   at least two output terminals;
   a plurality of interconnections for connecting said reactances with respect to one another and for connecting at least one of said reactances with said input and output terminals,
   wherein said plurality of interconnections includes miniaturized relays that allow an exchange of a series of said reactances for a parallel connection and vice versa;
   a voltage monitor to monitor at least one of said condensers suitable and detect a voltage variation of said at least one of said condensers over time; and
   a controller for disconnecting said at least one of said condensers from said input terminals when a voltage of said at least one of said condensers reaches a predetermined value.

2. Circuit according to claim 1, further comprising at least a second group of reactances with at least two reactances, a plurality of interconnections for connecting said reactances of said second group with respect to one another and for connecting at least one of said reactances of said second group with said input and output terminals,
   wherein said interconnections include miniaturized relays that allow an exchange of a series connection of said reactances of said second group for a parallel connection and vice versa.

3. Circuit according to claim 1, wherein said regulator circuit is integrated in an integrated circuit.

4. Circuit according to claim 1, further comprising a digital power supply module, that generates a necessary voltage to supply a digital circuitry included in said regulator circuit, and a first power supply having a first normally-on security relay in its first power input terminals, and a second power supply having a second normally-off security relay in its supply input terminals, wherein said second relay is closed through the voltage generated by said first power supply.

5. Circuit according to claim 4, wherein said second power supply comprises a second regulator circuit including at least two input terminals, at least a first group of reactances with at least two reactances, at least two output terminals, a plurality of interconnections suitable for connecting said reactances with respect to one another and suitable for connecting at least one of said reactances with said input and output terminals, wherein said interconnection include miniaturized relays and wherein said miniaturized relays allows the exchange of a series connection of said reactances for a parallel connection and vice versa.

6. Circuit according to claim 1, further comprising an input protection module including a normally-off relay that avoids overloads arriving at said reactances when said regulator circuit is turned off.

7. Circuit according to claim 1, further comprising a rectifying module that rectifies an input signal connected to said input terminals.

8. Circuit according to claim 7, wherein said rectifying module includes miniaturized relays suitable for reversing the polarity of said input terminals in a dynamic fashion depending on an alternating signal connected to said input terminals.

9. Circuit according to claim 1, further comprising a reference signal module that compares the signal in said input terminals with the signal in said output terminals and sends a control to a signal regulation module.

10. Circuit according to claim 1, further comprising an output module including an output filter with an output condenser.

11. Circuit according to claim 1, further comprising an output protection module with a normally-off security relay, so that in case of overload at the output said security relay opens and disconnects said regulator circuit from said output terminals.

12. Circuit according to claim 1, further comprising an A/D converter connected to said input terminals.

13. Circuit according to claim 1, wherein said miniaturized relay comprises:
   a first zone facing a second zone,
   a first condenser plate,
   a second condenser plate arranged in said second zone, in which said second plate is smaller than or equal to said first plate, an intermediate space arranged between said first zone and said second zone, a conductive element arranged in said intermediate space, said conductive element being mechanically independent from said first zone and second zone and being suitable for effecting a movement across said intermediate space depending on voltages present in said first and second condenser plates, a first contact point of an electric circuit, a second contact point of said electric circuit, in which said first and second contact points define first stops, in which said conductive element is suitable for entering into contact with said first stops and in which said conductive element closes said electric circuit when in contact with said first stops.

14. Use of a circuit according to claim 1 for manufacturing a power supply.

15. Use of a circuit according to claim 1 for manufacturing a converter from the group formed by DC/DC, AC/DC and DC/AC converters.

16. Use of a circuit according to claim 1 for manufacturing an A/D converter.

17. Use of a circuit according to claim 1 for manufacturing a D/A converter.

18. Use of a circuit according to claim 1 for manufacturing a power amplifier.

19. Circuit according to claim 1, further comprising an A/D converter connected to said output terminals.

20. Circuit according to claim 19, wherein said A/D converter comprises a segmented converter comprising: a first voltage divider with G impedances, G comparator devices connected between an output signal and said voltage divider, each of said comparator devices including a second voltage divider with G impedances and a comparator, and a second A/D converter.

21. Circuit according to claim 20, further comprising an output buffer.

22. Circuit according to claim 12, further comprising a second regulator circuit including at least two input terminals, at least a first group of reactances with at least two reactances, at least two output terminals, a plurality of interconnections suitable for connecting said reactances with respect to one another and suitable for connecting at least one of said reactances with said input and output terminals, wherein said interconnections include miniaturized relays that allow the exchange of a series connection of said reactances for a parallel connection and vice versa, said second regulator circuit being connected to said output terminals of said regulator circuit.

23. Circuit according to claim 12, further comprising a track and hold amplifier.

24. Circuit according to claim 13, wherein said first contact point is between said second zone and said conductive element.

25. Circuit according to claim 13, wherein said first plate is in said second zone.

26. Circuit according to claim 13, wherein said first plate is in said first zone.

27. Circuit according to claim 13, wherein said second contact point is in said second zone.

28. Circuit according to claim 13, further comprising a second stop between said first zone and said conductive element.

29. Circuit according to claim 13, further comprising a third contact point arranged between said first zone and said conductive element, in which said third contact point defines a second stop, such that said conductive element closes a second electric circuit when in contact with said second contact point and said third contact point.

30. Circuit according to claim 13, wherein said conductive element has rounded external surfaces.

31. Circuit according to claim 13, wherein said conductive element has an upper face and a lower face, said upper and lower faces being perpendicular to said movement of said conductive element, and at least one lateral face, in which said lateral face has slight protuberances.

32. Circuit according to claim 13, wherein said conductive element is hollow.

33. Circuit according to claim 13, wherein one of said condenser plates is simultaneously one of said contact points.

34. Circuit according to claim 13, further comprising a normally-off relay formed by one of said miniaturized relays the conductive element of which is shaped with a material having a contact energy high enough to compensate for its weight.

35. Circuit according to claim 13, further comprising a normally-on relay formed by one of said miniaturized relays the conductive element of which is shaped with a material having a contact energy high enough to compensate for its weight.

36. Circuit according to claim 13, further comprising a normally-off relay including two of said miniaturized relays, connected in series, wherein the first miniaturized relay has a first conductive element suitable for moving in the space according to a first direction, and wherein the second miniaturized relay is rotated 180° with respect to said first miniaturized relay according to an axis perpendicular to said first direction, so that the two conductive elements of both miniaturized relays are suitable for being moved in the same direction, but they must be moved in opposite directions in order to achieve the same connection or disconnection state.

37. Circuit according to claim 13, further comprising a normally-on relay including two of said miniaturized relays connected in parallel, wherein the first miniaturized relay has a first conductive element suitable for moving in the space according to a first direction, and wherein the second miniaturized relay is rotated 180° with respect to said first miniaturized relay according to an axis perpendicular to said first direction, so that the two conductive elements of both miniaturized relays are suitable for being moved in the same direction, but they must be moved in opposite directions in order to achieve the same connection or disconnection state.

38. Circuit according to claim 25, wherein said first condenser plate and said second condenser plate have the same surface area.

39. Circuit according to claim 26, wherein said first condenser plate has a surface area which is equal to or double the surface area of said second condenser plate.

40. Circuit according to claim 26, further comprising a third condenser plate arranged in said second zone, in which said third condenser plate is smaller than or equal to said first condenser plate, and in which said second and third condenser plates are, together, larger than said first condenser plate.

41. Circuit according to claim 26, further comprising a third condenser plate arranged in said second zone and a fourth condenser plate arranged in said first zone, in which said first condenser plate and said second condenser plate are equal to each other, and said third condenser plate and said fourth condenser plate are equal to each other.

42. Circuit according to claim 41, wherein said first, second, third and fourth condenser plates are all equal to each other.

43. Circuit according to claim 41, further comprising a fifth condenser plate arranged in said first zone and a sixth condenser plate arranged in said second zone, in which said fifth condenser plate and said sixth condenser plate are equal to each other.

44. Circuit according to claim 43, further comprising six condenser plates arranged in said first zone and six condenser plates arranged in said second zone.

45. Circuit according to claim 29, wherein said conductive element comprises a hollow cylindrical part which defines a axis, in the interior of which is housed said second contact point, and a flat part which protrudes from one side of said radially hollow cylindrical part and which extends in the direction of said axis, in which said flat part has a height, measured in the direction of said axis, which is less than the height of said cylindrical part measured in the direction of said axis.

46. Circuit according to claim 29, wherein said conductive element comprises a hollow parallelepipedic part which defines a axis, in the interior of which is housed said second contact point, and a flat part which protrudes from one side of said radially hollow parallelepipedic part and which extends in the direction of said axis, in which said flat part has a height, measured in the direction of said axis, which is less than the height of said parallelepipedic part, measured in the direction of said axis.

47. Circuit according to claim 13, further comprising a third contact point and a fourth contact point arranged between said first zone and said conductive element, in which said third contact point and fourth contact point define second stops, such that said conductive element closes a second electric circuit when in contact with said third contact point and fourth contact point.

48. Circuit according to claim 13, wherein each of the assemblies of said condenser plates arranged in each of said first and second zones has central symmetry with respect to a centre of symmetry, and in which said centre of symmetry is superposed to the centre of masses of said conductive element.

49. Circuit according to claim 13, wherein the assembly of said condenser plates arranged in each of said first and second zones has central asymmetry, thus generating a moment of forces with respect to the centre of masses of said conductive element.

50. Circuit according to claim 47, wherein, between said first zone and said second zone extend two lateral walls, in which there is play between said lateral walls and said conductive element, said play being sufficiently small so as to geometrically prevent said conductive element from simultaneously entering into contact with a contact point of the group formed by said first and second contact points and with a contact point of the group formed by said third and fourth contact points.

51. Circuit according to claim 30, wherein said conductive element is cylindrical.

52. Circuit according to claim 30, wherein said conductive element is spherical.

53. Circuit according to claim 36, further comprising a second normally-off relay equal to said normally-off relay, but arranged in the space so that its conductive elements move according to a second direction perpendicular to said first direction.

54. Circuit according to claim 53, further comprising a third normally-off relay equal to said normally-off relay, but arranged in the space so that its conductive elements move according to a third direction perpendicular to said first and second direction.

55. Circuit according to claim 37, further comprising a second normally-on relay equal to said normally-on relay, but arranged in the space so that its conductive elements move according to a second direction perpendicular to said first direction.

56. Circuit according to claim 55, further comprising a third normally-on relay equal to said normally-on relay, but arranged in the space so that is conductive elements move according to a third direction perpendicular to said first and second direction.

* * * * *